(12) United States Patent
Kogi

(10) Patent No.: US 10,097,710 B2
(45) Date of Patent: Oct. 9, 2018

(54) IMAGE READING APPARATUS AND IMAGE READING METHOD

(71) Applicant: SEIKO EPSON CORPORATION, Tokyo (JP)

(72) Inventor: Shinsuke Kogi, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/298,488

(22) Filed: Oct. 20, 2016

(65) Prior Publication Data

US 2017/0126911 A1 May 4, 2017

(30) Foreign Application Priority Data

Oct. 28, 2015 (JP) ................. 2015-211721

(51) Int. Cl.
*H04N 1/04* (2006.01)
*H04N 1/00* (2006.01)
*H04N 1/203* (2006.01)

(52) U.S. Cl.
CPC ..... *H04N 1/00588* (2013.01); *H04N 1/00013* (2013.01); *H04N 1/0035* (2013.01); *H04N 1/00037* (2013.01); *H04N 1/00389* (2013.01); *H04N 1/00681* (2013.01); *H04N 1/00724* (2013.01); *H04N 1/203* (2013.01); *H04N 2201/0081* (2013.01); *H04N 2201/0434* (2013.01)

(58) Field of Classification Search
CPC ........... H04N 1/00588; H04N 1/00013; H04N 1/00037; H04N 1/00389; H04N 1/00681; H04N 1/00724

USPC ................. 358/488, 486, 496, 498, 468; 250/234–236

See application file for complete search history.

(56) References Cited

U.S. PATENT DOCUMENTS

| | | | |
|---|---|---|---|
| 6,313,930 B1 | 11/2001 | Oshima et al. | |
| 6,801,344 B2 * | 10/2004 | Morinaga | H04N 1/00525 358/473 |
| 2005/0274791 A1 * | 12/2005 | Ikeda | B65H 7/12 235/375 |

(Continued)

FOREIGN PATENT DOCUMENTS

| | | |
|---|---|---|
| JP | 2005-260387 A | 9/2005 |
| JP | 2008-236702 A | 10/2008 |

(Continued)

OTHER PUBLICATIONS

The Extended European Search Report for the corresponding European Application No. 16195594.3 dated Apr. 11, 2017.

*Primary Examiner* — Cheukfan Lee

(57) ABSTRACT

An image reading apparatus which reads an image of a document is provided with a transport unit (rollers, and the like) which transports a document, a reading unit which reads a document, a double feeding detecting sensor (double feeding detecting unit) which can detect double feeding of a document, and a carrier sheet sensor (CS sensor) (sheet detecting unit) which detects a carrier sheet which is transported in a state of interposing a document between two transparent sheet portions. The CS sensor is provided at a position on the upstream side of the double feeding detecting sensor in the transport direction, in a transport direction of a document.

13 Claims, 12 Drawing Sheets

(56) References Cited

U.S. PATENT DOCUMENTS

| | | | |
|---|---|---|---|
| 2006/0285858 A1* | 12/2006 | Shin | G03G 15/6573 399/16 |
| 2007/0127087 A1 | 6/2007 | Nabemoto et al. | |
| 2008/0204827 A1 | 8/2008 | Yoshio et al. | |
| 2011/0194127 A1 | 8/2011 | Nagakoshi et al. | |
| 2013/0069299 A1 | 3/2013 | Matsuoka et al. | |
| 2015/0156357 A1* | 6/2015 | Yabe | H04N 1/00803 358/498 |
| 2015/0281488 A1 | 10/2015 | Kawauchi | |
| 2017/0094086 A1* | 3/2017 | Nomoto | H04N 1/00588 |
| 2017/0111524 A1* | 4/2017 | Tajima | H04N 1/00037 |
| 2017/0126911 A1* | 5/2017 | Kogi | H04N 1/0035 |

FOREIGN PATENT DOCUMENTS

| | | |
|---|---|---|
| JP | 2011-166537 A | 8/2011 |
| JP | 2013-063843 A | 4/2013 |
| JP | 2014-068243 A | 4/2014 |
| JP | 2014-216998 A | 11/2014 |

\* cited by examiner

IMAGE READING APPARATUS AND IMAGE READING METHOD

BACKGROUND

1. Technical Field

The present invention relates to an image reading apparatus such as a scanner which reads an image of a document, and an image reading method.

2. Related Art

In the related art, in an image reading apparatus, a sheet feeding type device in which a transport unit which can transport a document sheet by sheet along a transport path is provided, and a document which is being transported is read by a reading unit which is disposed at a predetermined position in the middle of the transport path, and a flat-bed type device in which a reading unit provided in a carriage reads a document while the carriage moves relative to the document mounted on a document stand are known.

For example, in JP-A-2013-63843, a document reading apparatus which is provided with an ultrasonic sensor (double feeding detecting unit) which detects double feeding in which a plurality of documents are transported while being overlapped has been disclosed. The ultrasonic sensor includes an ultrasonic transmitter and an ultrasonic receiver which are disposed facing each other with a transport path of a medium interposed therebetween. In addition, there are provided in the document reading apparatus a type detecting unit which distinguishes a first medium from a second medium which is thicker than the first medium transported on the transport path and provides a type detection result, and a double feeding detecting unit which detects, based on an output of the ultrasonic sensor, whether or not there is double feeding of a medium which is transported on the transport path. An output of the ultrasonic sensor is adjusted according to the paper thickness of the document in the middle of being transported, which is detected by the type detecting unit. For example, an output intensity of the ultrasonic sensor when a transported document is a card document is adjusted so as to be stronger than that when a transported document is a paper document. For this reason, it is possible to prevent a card document from being erroneously detected as double feeding of a paper document.

Meanwhile, in the image reading apparatus of the sheet feeding type, there is a need to read an image of a booklet document, which is formed of a plurality of pages, such as a passport or a bank book, or an image of a folded document which is folded in two, such as a résumé. However, the transport unit is provided with a separating mechanism which separates, sheet by sheet, the plurality of documents which are mounted on a document support. For this reason, there is a case in which it is not possible to appropriately read an image of a booklet document or a folded document, since the image is shifted aslant, or the like, due to a force applied by the separating mechanism at the time of transportation, and which separates the document sheet by sheet. Consequently, there has been disclosed a technique in which the booklet document or the folded document is interposed in a carrier sheet formed by bonding a part of a peripheral edge portion of two colorless and transparent sheets, and an image of the document which is interposed in the carrier sheet is read without an obstruction from the separating mechanism (for example, JP-A-2008-236702, JP-A-2014-68243, JP-A-2005-260387, JP-A-2014-216998, and the like).

For example, in JP-A-2008-236702, a carrier sheet on which a transfer protocol or user identification information is present is disclosed. When reading a document by interposing the document in the carrier sheet, an image reading apparatus reads the user identification information, and reading of a document corresponding to a setting for each user based on the user identification information is performed.

In addition, in JP-A-2014-68243, JP-A-2005-260387, and JP-A-2014-216998, an image reading apparatus in which processing of combining a front face image and a rear face image, which are obtained by reading and combining both faces into one image, is performed, in a case of reading both faces by interposing a folded document in a carrier sheet is disclosed. For example, in the image reading apparatus described in JP-A-2014-68243, a position of a fold is specified by using a mark of an edge portion of a carrier sheet, and the front face image and the rear face image are combined at a position of the specified fold.

Meanwhile, in the image reading apparatus provided with the document feeding detecting unit (ultrasonic sensor) described in JP-A-2013-63843, when reading a document by interposing the document in a carrier sheet, there has been a problem in that a portion of two sheet portions of the carrier sheet is erroneously detected as double feeding of a document (for example, a paper document). For this reason, for example, there has been a need for a mechanism which performs an operation that invalidates detection of double feeding, or an operation that invalidates detection of double feeding with respect to a reading driver of a host device connected to the image reading apparatus so as to communicate therewith by operating an operation unit of the image reading apparatus. However, even when such a mechanism is added, a carrier sheet may be erroneously detected as double feeding of a paper document when a user forgets to perform an operation of invalidating detection of double feeding, and double feeding of a paper document may not be detected when reading the subsequent paper document when the user forgets to perform an operation of returning the double feeding detection to a valid state from the invalid state thereafter, which causes a failure when reading a document due to double feeding. In addition, such a problem is not limited to a sheet feeding-type image reading apparatus; approximately the same problem may occur in a flat-bed type image reading apparatus provided with an automatic document feeder which feeds a document to a document stand sheet by sheet, as an example of a transport unit.

SUMMARY

An advantage of some aspects of the invention is to provide an image reading apparatus and an image reading method in which a frequency of erroneously detecting a carrier sheet as double feeding of a document by using the double feeding detecting unit can be reduced.

Hereinafter, means of the invention, and operational effects thereof will be described.

According to an aspect of the invention, there is provided an image reading apparatus which reads an image of a document including a transport unit which transports a document; a reading unit which reads a document; a double feeding detecting unit which can detect double feeding of a document; and a sheet detecting unit which detects a carrier sheet which is transported in a state of interposing a document between two transparent sheet portions, in which the sheet detecting unit is provided at a position on an upstream side of the double feeding detecting unit in a transport direction of a document.

According to the configuration, whether or not a transport target is a carrier sheet is detected by the sheet detecting unit, which is located on the upstream side of the double feeding detecting unit in the transport direction of a document. Accordingly, it is possible for the sheet detecting unit to detect that a transport target is a carrier sheet before the double feeding detecting unit erroneously detects the carrier sheet as double feeding of a document. For this reason, it is possible to avoid a situation in which a reading operation of a document interposed in the carrier sheet performed by the reading unit is stopped due to such an erroneous detection of the double feeding detecting unit.

In the image reading apparatus, it is preferable that, when the sheet detecting unit detects a carrier sheet, detection of the double feeding detecting unit be invalidated.

According to the configuration, when the sheet detecting unit detects a carrier sheet, the detection of the double feeding detecting unit is invalidated. Accordingly, it is possible to invalidate the double feeding detecting unit before the double feeding detecting unit erroneously detects the carrier sheet as double feeding of a document. For this reason, also in a configuration in which a reading operation is stopped in a case of detecting double feeding of a document, it is possible to continue a reading operation of a document which is interposed in the carrier sheet without stopping. In addition, for example, since it is not necessary for a user to perform operation of invalidating the detection of the double feeding detecting unit, it is possible to reduce user burden.

In the image reading apparatus, it is preferable to further include a direction detecting unit which can detect whether a direction of the carrier sheet is a forward direction or a rearward direction; and a processing unit which switches image reading processing contents according to the direction detected by the direction detecting unit.

According to the configuration, whether a direction of the carrier sheet is the forward direction or the rearward direction is detected by the direction detecting unit, and image reading processing contents by the processing unit are switched according to the detected direction. For this reason, it is possible to perform image reading processing of a document with appropriate contents corresponding to the detected direction, with respect to an image which is obtained when a reading unit reads a carrier sheet in which a document is interposed. Accordingly, it is possible for a user to designate contents of processing to be performed using an image reading apparatus, by selecting a direction in which a carrier sheet is to be set in the image reading apparatus, between the forward direction and the rearward direction.

In the image reading apparatus, it is preferable that the processing unit switch a side at which a front face image and a rear face image of a document are combined, according to a direction in which the carrier sheet is detected.

According to the configuration, the processing unit selects a side at which the front face image and the rear face image of a document (for example, folded document, or the like) interposed in a carrier sheet are to be combined, from among the left and right sides, according to a direction in which the carrier sheet is detected by the direction detecting unit. Accordingly, it is possible for a user to select a side at which two images are combined, from among the left and right sides, by selecting a direction in which the carrier sheet in which a document is interposed is to be set in the image reading apparatus, from among the forward direction and the rearward direction. As a result, the user can obtain a desired image of which the front face image and the rear face image are combined on a desired side.

In the image reading apparatus, it is preferable that the processing unit include at least one of a reading condition of reading an image of a document, image processing contents which are provided in read data obtained by the reading unit, and a storing condition of storing read data after image processing in a designated storage destination, in image reading processing contents which are switched according to a direction in which the carrier sheet is detected.

According to the configuration, at least one of a reading condition of reading an image of a document, image processing contents which are performed with respect to read data, and a storing condition of storing read data after performing image processing in a designated storage destination is switched according to a set direction of the carrier sheet. Accordingly, it is possible for a user to select at least one of the reading condition, the image processing contents, and the storing condition, by selecting a direction in which the carrier sheet is set in the image reading apparatus, from among the forward direction and the rearward direction.

In the image reading apparatus, it is preferable that a portion to be detected, with which it is possible to detect a carrier sheet, is provided in the carrier sheet, be provided in the carrier sheet and that the sheet detecting unit be provided at a position at which it is possible to detect the portion to be detected in a process of transporting the carrier sheet by using the transport unit.

According to the configuration, it is possible for the sheet detecting unit to detect the portion to be detected, which is provided in the carrier sheet, in a process of transporting the carrier sheet, and to detect that a reading target is the carrier sheet, based on a detection result of the portion to be detected.

In the image reading apparatus, it is preferable that the portion to be detected, with which the direction detecting unit can detect whether or not a direction of the carrier sheet is the forward direction or in the rearward direction, be provided in the carrier sheet, and that the direction detecting unit be provided at a position at which the portion to be detected can be detected in a process in which the carrier sheet is transported by the transport unit.

According to the configuration, whether a setting direction of the carrier sheet is the forward direction or the rearward direction is detected when the direction detecting unit detects the portion to be detected which is provided in the carrier sheet. It is possible to combine the front face image and the rear face image of a document which is interposed in the carrier sheet at an appropriate side.

In the image reading apparatus, it is preferable that the portion to be detected be a hole, a lever-type document presence detecting unit be further provided, and the sheet detecting unit be disposed at a position offset in a width direction which intersects the transport direction with respect to the document presence detecting unit.

According to the configuration, since the sheet detecting unit which can detect the portion to be detected which is formed of a hole is offset in the width direction which intersects the transport direction of a document with respect to the lever-type document presence detecting unit, the lever of the document presence detecting unit is not present on a transport path of the portion to be detected. Accordingly, there is no case in which the lever of the document presence detecting unit is caught by a hole of the portion to be detected.

In the image reading apparatus, it is preferable that the portion to be detected be a window portion which is formed of a transparent material.

According to the configuration, since the portion to be detected is a window portion which is formed of a transparent material, it is difficult for a contact portion such as a lever of a contact-type detecting unit to be caught by the portion to be detected, compared to a case in which the portion to be detected is a hole. For example, since it is not necessary to cause the sheet detecting unit to be offset with respect to the document presence detecting unit in the direction intersecting the transport direction, a degree of freedom when disposing the sheet detecting unit increases, and for example, it contributes to compactification of the image reading apparatus.

According to another aspect of the invention, there is provided an image reading method including transporting a carrier sheet in which a portion to be detected is provided in a bonding portion which forms a sheet portion for interposing a document which is obtained when two transparent sheets are bonded at a part of a peripheral edge portion, in a state of interposing a document in the sheet portion; detecting in which the portion to be detected is detected in the middle of transporting the carrier sheet; reading in which a front face image and a rear face image are obtained, by reading a front face and a rear face of a document which is interposed in the sheet portion, in the middle of transporting the carrier sheet; specifying a combining direction in which a side at which the front face image and the rear face image are combined based on a detection result which is obtained by detecting the portion to be detected; and image processing in which the front face image and the rear face image are combined at the specified side, and a combined image is generated.

According to the method, the portion to be detected which is provided in the bonding portion of the carrier sheet is read in the middle of transporting the carrier sheet. In specifying a combining direction, the side is specified based on a detection result which is detected by the portion to be detected. The front face image and the rear face image are combined at the specified side. Accordingly, it is possible to obtain a combined image in which the front face image and the rear face image of a document are combined at an appropriate side.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, one embodiment of an image reading apparatus will be described with reference to drawings.

Figure 1:
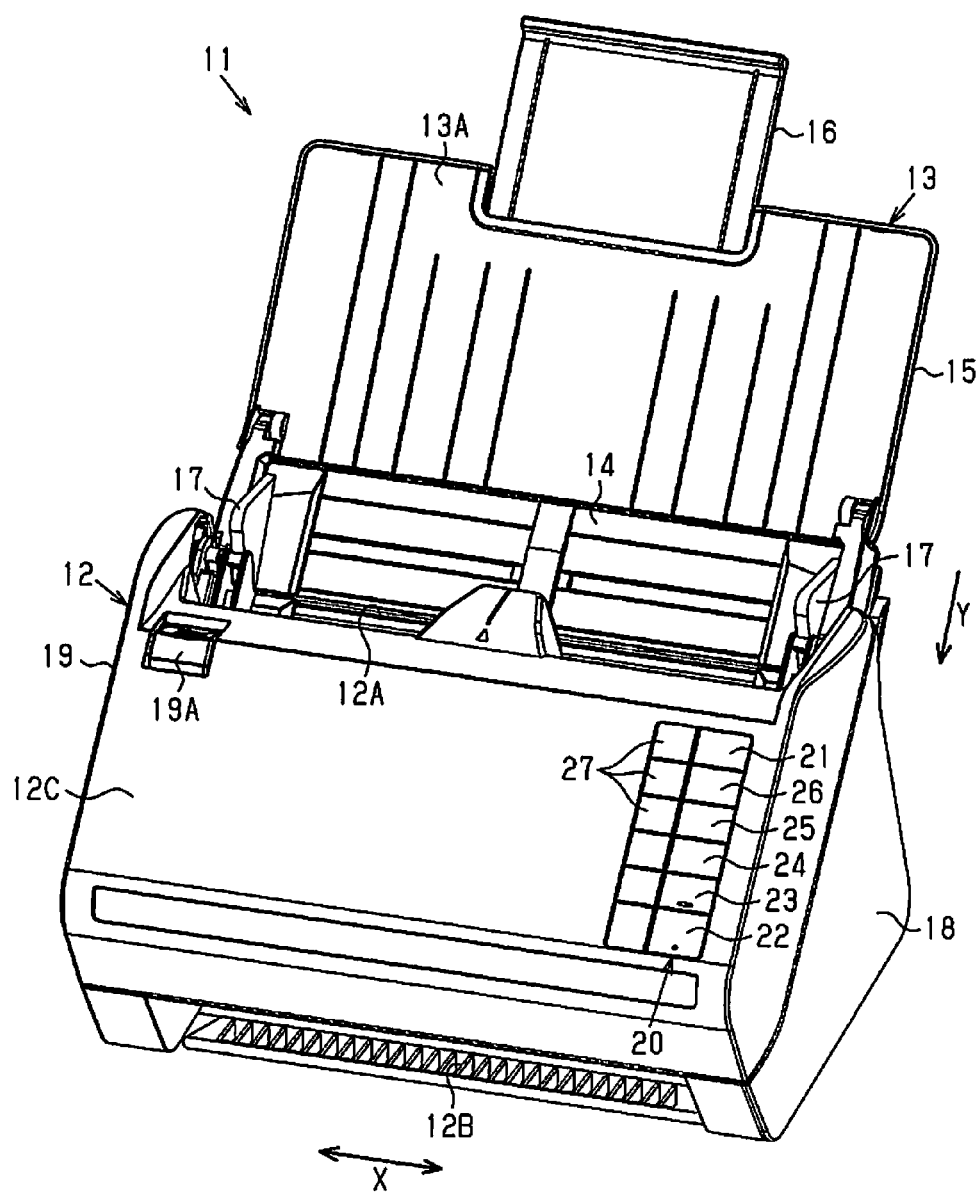
FIG. 1 is a perspective view which illustrates an image reading apparatus according to one embodiment.

As illustrated in FIG. 1, an image reading apparatus 11 according to the embodiment is provided with an apparatus main body 12 (hereinafter, simply referred to as "main body 12") which is formed in an approximately trapezoidal shape when viewed from a side, and a document support 13 which includes a mounting face 13A on which a document D as an image reading target, and a carrier sheet CS (described later), in which the document D is interposed, are mounted (set). The document D which is mounted on the document support 13 is fed, sheet by sheet, to a feeding port 12A which is open to the upper part of the main body 12. The fed document D is transported to the inside of the main body 12 along a predetermined transport path 32 (refer to FIG. 2), the fed document of which an image is read at a reading position in the middle of transporting thereof, is discharged from a discharging port 12B which is open to the front-lower part of the main body 12, and is mounted on a discharging tray 18A (refer to FIG. 2), for example. According to the embodiment, a document D such as a booklet document, for example, a passport, a bank book, or the like, and a folded document such as a resume which is formed by folding an A3-size paper in two, or the like, are set on the document support 13 in each carrier sheet CS in a state of being interposed in the carrier sheet CS which is colorless and transparent, and will be described later.

The document support 13 is provided with a first support unit 14 of which a base end portion (lower end portion) is rotatably connected to the main body 12, and a second support unit 15 of which a base end portion is rotatably connected to a tip end portion of the first support unit 14. A sliding auxiliary support unit 16 is provided at a tip end portion of the second support unit 15 so as to advance or retreat. The document support 13 extends obliquely to a rear-upper side of the main body 12, in which the document support functions as a support on which a document can be mounted, and can be disposed at an open position (usable position), as illustrated in FIG. 1, and a closing position (accommodating position) in which a top face portion and a front face portion 12C of the main body 12 are covered, by being rotated by a user from the open position in a paper forward direction in FIG. 1.

A pair of edge guides 17 which can slide in a width direction X intersecting (orthogonal, particularly) a transport direction Y in which the document D is transported is provided on the mounting face 13A of the document support 13. The document D or the carrier sheet CS which is mounted on the mounting face 13A is positioned in the width direction X with respect to the feeding port 12A, by being interposed between the pair of edge guides 17. In addition, the width direction X is set to a main scanning direction when the image reading apparatus 11 reads an image of a document, and the transport direction Y is set to a sub-scanning direction.

Figure 2:
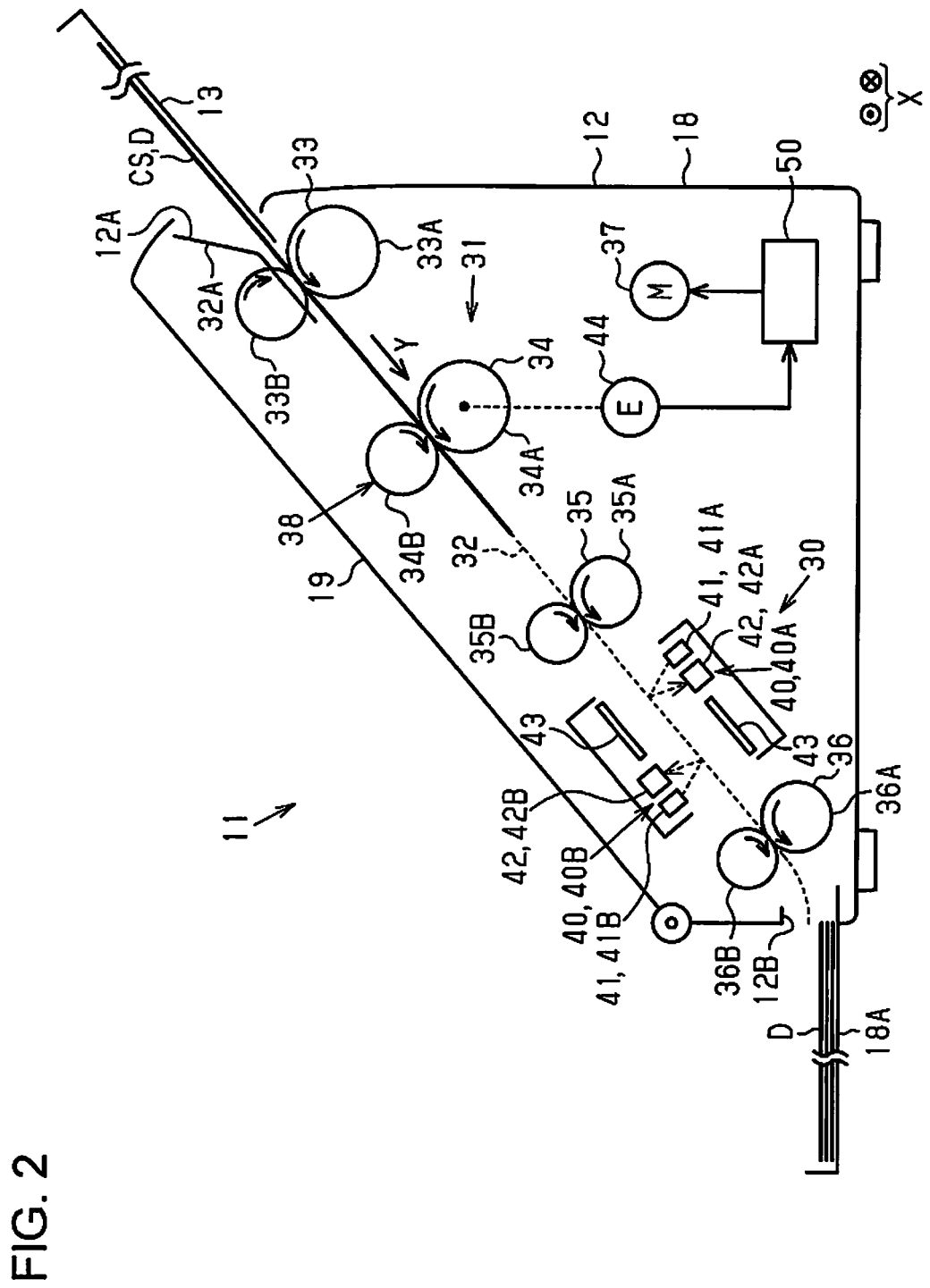
FIG. 2 is a side sectional view which schematically illustrates the image reading apparatus.

As illustrated in FIGS. 1 and 2, the main body 12 is provided with a main body portion 18, and a cover portion 19 which is rotatably connected around a front end portion of the main body portion 18. As illustrated in FIG. 2, a transport path 32 is formed from the feeding port 12A to the discharging port 12B between the main body portion 18 and the cover portion 19, in a state in which the cover portion 19 is disposed at the closing position which is illustrated in FIGS. 1 and 2. When a user releases locking of the cover portion 19 by operating an operation unit 19A which is illustrated in FIG. 1, and the cover portion 19 is rotated from the closing position illustrated in FIG. 1 to the closing position in the paper forward direction in FIG. 1, a transport face portion 39 (refer to FIG. 3) which forms one face portion of the transport path 32 is exposed. By setting the transport face portion 39 to an exposed state by opening the cover portion 19, maintenance, or the like, of rollers 33A to 36A, and the like (refer to FIG. 2), for removing paper clogged (jammed), or for feeding-transporting of a document D is performed.

As illustrated in FIG. 1, an operation unit 20 is provided at the front face portion 12C of the main body 12 (cover portion 19). The operation unit 20 is provided with a plurality of operation switches 21 to 26 which are operated by a user when giving an instruction to the image reading apparatus 11. Specifically, the operation unit 20 is configured of various switches such as a power supply switch 21, a start switch 22, a stop switch 23, a mode selecting switch 24, a double feeding detection invalidating switch 25 (double feeding inspection skip switch), and a switch for wireless communication 26. The double feeding detection invalidating switch 25 is operated when invalidating a double feeding detection in which a presence or absence of double feeding, in which a plurality of the documents D are fed by being overlapped, is inspected, and the double feeding detection is not performed when the double feeding detection is invalidated. A notifying unit 27 configured of an indicating lamp which is capable of performing at least one of lighting and flickering, and lights-out using an LED, or the like, for example, or is capable of changing a lighting color when performing lighting is provided at a position which is close to the operation unit 20. The notifying unit 27 notifies a user of, for example, ON/OFF of a power supply, a mode which is currently selected, validity/invalidity of a double feeding detection, and the like, using ON/OFF of the indicating lamp, or a change in lighting color.

As illustrated in FIG. 2, an image reading processing mechanism 30 which performs image reading processing (scanning processing) is provided inside the main body 12 of the image reading apparatus 11. The image reading processing mechanism 30 is provided with a transport unit 31 which transports a document D. The transport unit 31 feeds a plurality of documents D which are mounted on the document support 13 while guiding thereof to the inside of the main body 12 along a plate-shaped feeding guide 32A, sheet by sheet, from the feeding port 12A, and transports the fed document D at a constant transport speed along the transport path 32.

The transport unit 31 is provided with a pair of feeding rollers 33 which are disposed at a position at an upstream end of the transport path 32 in the main body 12, a pair of feeding rollers 34 which are disposed on the downstream side of the pair of feeding rollers 33 in the transport direction, a pair of transport rollers 35 which are disposed on the upstream side by interposing a reading position of a document D therebetween in the transport direction Y, and a pair of transport rollers 36 which are disposed on the downstream side.

The pair of feeding rollers 33 and 34 are configured of driving rollers 33A and 34A, and driven rollers 33B and 34B. In addition, the pair of transport rollers 35 and 36 are configured of driving rollers 35A and 36A, and driven rollers 35B and 36B. Each of the driven rollers 33B to 36B performs an accompanying rotation due to rotations of the driving rollers 33A to 36A which form a pair, respectively.

Each of the driving rollers 33A to 36A which configures the plurality of pair of rollers 33 to 36 is rotatably driven using power of a transport motor 37 as a power source of the rollers. The driven roller 34B which configures the pair of feeding rollers 34 is set to a retard roller, and of which a friction coefficient is set to be larger than that of the driving roller 34A with respect to a document D on the outer peripheral face. For this reason, the pair of feeding rollers 34 functions as a separating mechanism 38 which feeds the document D to the downstream side in the transport direction Y by separating the document D sheet by sheet. Accordingly, the plurality of documents D which are mounted on the document support 13 due to a rotation of the pair of feeding rollers 33 are fed to the inside of the main body 12 from the feeding port 12A, sheet by sheet in order from the lowermost document, for example, and are fed to the downstream side in the transport direction Y by being separated sheet by sheet due to a rotation of the pair of feeding rollers 34. When a booklet document or a folded document is fed as is, there is a concern that the document may be fed by being deviated due to a separating operation of the separating mechanism 38. For this reason, when scanning a document D such as a booklet document or a folded document, a user sets the document D to the document support 13 by interposing the document in the carrier sheet CS (refer to FIG. 4), and transports the document D in each carrier sheet CS.

As illustrated in FIG. 2, a pair of reading units 40 is provided on both sides interposing the transport path 32, at a reading position in the middle of the transport path 32 which is formed in the main body 12 using the pair of feeding rollers 33 and 34, and pair of transport rollers 35 and 36. The pair of reading units 40 is formed of a first reading unit 40A and a second reading unit 40B, and is disposed at a position which is slightly deviated to the transport direction Y so as not to face each other. The pair of reading units 40 is configured of a light source 41 which can radiate light to a document D in the middle of being transported, and an image sensor 42 which extends in the main scanning direction (width direction X). In a case of a normal reading mode in which a single face (front face) of a document D is read, the first reading unit 40A performs a reading operation, and in a case of a double side reading mode in which both faces (front and rear faces) of a document D is read, the first reading unit 40A and the second reading unit 40B perform a reading operation together.

The light source 41 is configured of an LED, a fluorescent lamp, or the like, for example. The image sensor 42 receives reflected light which is obtained when light output from the light source 41 is reflected on a document D, or the like, and outputs a pixel signal with a value corresponding to a light receiving amount, by converting the received light into an electric signal. The image sensor 42 is a linear image sensor, for example. The image reading apparatus 11 can perform color scanning and monochrome scanning (grayscale scanning). In the color scanning method, there are a method in which an image sensor is monochrome, and pixel signals of each RGB color is obtained in order from the image sensor, by causing a light source of each RGB color to emit light in time series, and a method in which an image sensor is provided with a photoelectric conversion element of each RGB color which is covered by a color filter, and each pixel signal of RGB is obtained from each of the photoelectric conversion elements by causing a white light source to emit light. Both of the methods may be adopted in the color scanning method. In addition, in the following, there is a case in which the light source 41 and the image sensor 42 are described as a first light source 41A and a first image sensor 42A by being denoted as elements on the first reading unit 40A side, and are described as a second light source 41B and a second image sensor 42B by being denoted as elements on the second reading unit 40B side.

In addition, a color reference plate 43 is disposed at a position facing the image sensor 42 by interposing the transport path 32 therebetween. The color reference plate 43 is for obtaining a white reference value for shading correction, and in which a white reference plate which presents a white color, or a gray reference plate which presents gray (gray color) is used. The gray reference plate is used when detecting a position and a region of a document D based on a different in color or a luminance value between a document and a background, from read data which is obtained by reading the color reference plate 43 as a background of a document (gray background). In addition, in a case in which detecting of a document is performed by using an exclusive sensor for detecting a document, it is preferable to set the color reference plate 43 to the white reference plate.

The image sensor 42 is, for example, a compact image sensor in which a plurality of photoelectric conversion elements are disposed in a line along the main scanning direction X. In addition, the image sensor 42 is specifically, a complementary metal oxide semiconductor (CMOS) image sensor.

The image sensor 42 performs a photoelectrical conversion with respect to light which is received by each photoelectric conversion element, and outputs a pixel signal with a value corresponding to a received light amount.

As illustrated in FIG. 2, an encoder 44 (for example, rotary encoder) which can detect a rotation of one driving roller among the plurality of pair of rollers 33 to 36 is provided inside the main body 12. The encoder 44 outputs a detection signal including the number of pulses which is proportional to a rotation amount of a diving roller. A detection signal of the encoder 44 is input to a controller 50 which is disposed inside the main body 12, and is used when grasping a position (transport position) of a transport target in the middle of being transported, when the controller 50 counts the number of pulses of the detection signal from a position in which a tip end of a transport target such as a document D or a carrier sheet CS is detected.

As illustrated in FIG. 2, the encoder 44 (for example, rotary encoder) which can detect a rotation of one driving roller of the plurality of pair of rollers 33 to 36 is provided inside the main body 12. The encoder 44 outputs a detection signal which includes the number of pulses which is proportional to a rotation amount of the driving roller. The detection signal of the encoder 44 is input to the controller 50 which is disposed inside the main body 12, and is used when grasping a position (transport position) of a transport target in the middle of transporting, by counting the number of pulses of the detection signal from a position in which a tip end of the transport target such as the document D or the carrier sheet CS is detected by the controller 50.

The light source 41 and the image sensor 42 which configure the transport motor 37, and the reading unit 40 (40A and 40B) are controlled by the controller 50. In addition, the controller 50 controls the image reading apparatus 11 based on an instruction which is given by using an operation signal from the operation unit 20 which is operated by a user.

Figure 3:
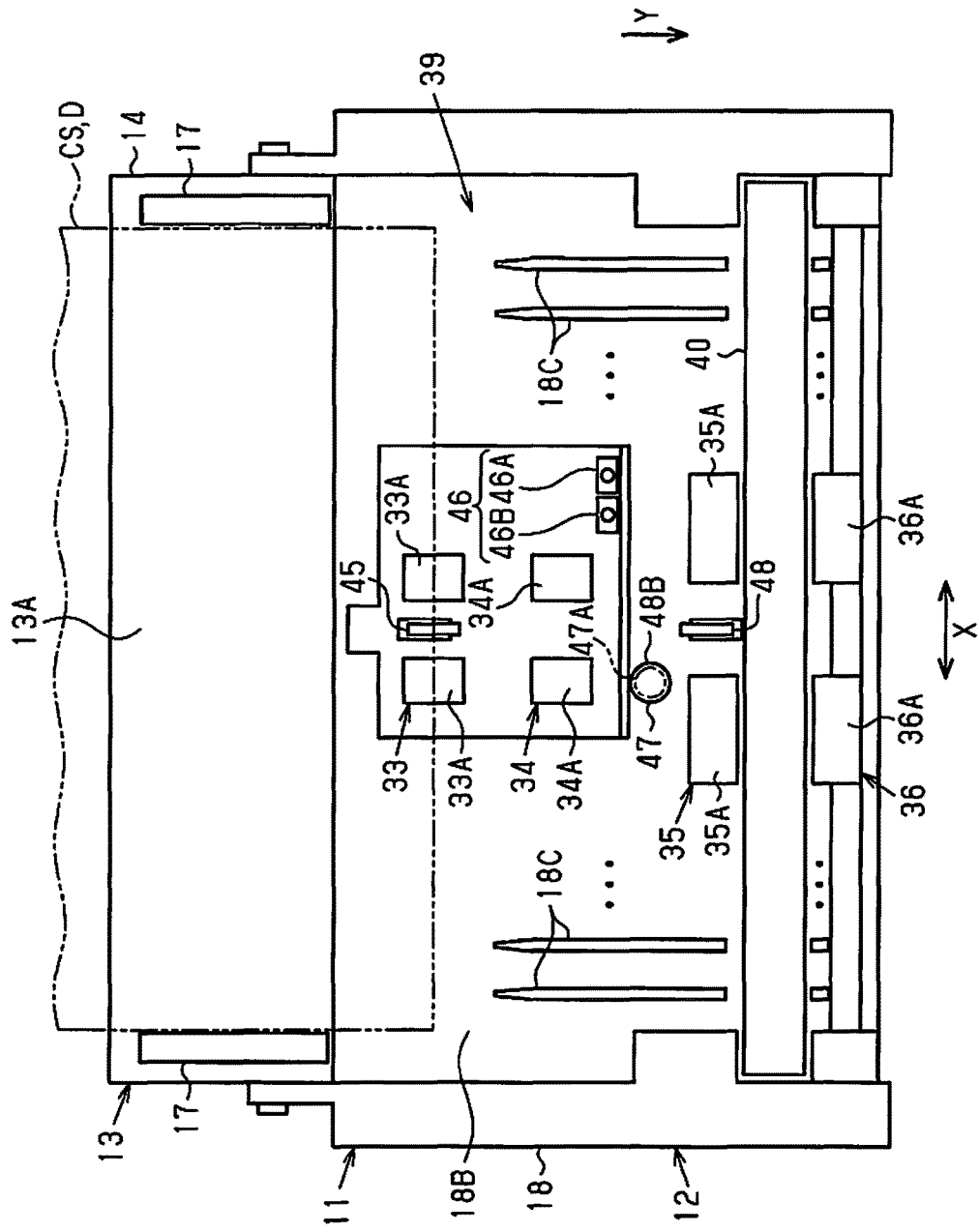
FIG. 3 is a schematic plan view which illustrates a transport face portion of a main body portion.

Subsequently, a transport face portion 39 which forms a lower face portion in the transport path of a document will be described with reference to FIG. 3. As illustrated in FIG. 3, the transport face portion 39 which is formed by a top face of the main body portion 18 includes a transport plate 18B which covers the top face of the main body portion 18, and a plurality of ribs 18C which protrude from the top face, and extend in parallel to each other along the transport direction Y. At an approximately center portion of the transport face portion 39, each of the driving rollers 33A and 34A which configures the pair of feeding rollers 33 and 34, and each of driving rollers 35A and 36A which configure the pair of transport rollers 35 and 36 are disposed with a slight interval in the width direction X, respectively, by forming a pair, in order from the upstream side in the transport direction Y. A document sensor 45 is disposed between the pair of driving rollers 33A which configure the pair of feeding rollers 33. The document sensor 45 is a contact-type sensor which includes, for example, a lever, and detects a presence or absence of a document D or a carrier sheet CS which is set on the document support 13, when the lever is pressed.

The controller 50 resets the transport counter 81 based on an ON signal of the document sensor 45 when a transport target is set at a feeding position, and grasps a transport position which is a position of a transport target in the transport direction Y, based on a discrete value which is obtained when the transport counter 81 counts a pulse, or the number of pulse edges of the detection signal which is input from the encoder 44 in the middle of driving the transport motor 37.

In addition, a double feeding detecting sensor 47 as an example of the double feeding detecting unit is disposed at a position between the driving roller 34A and the driving roller 35A in the transport direction Y. The double feeding detecting sensor 47 is an ultrasonic-type sensor, for example, and is provided with a transmitter 47A which can transmit an ultrasonic wave, and a receiver 47B (refer to FIG. 3) which is disposed at a position facing the transmitter 47A by interposing the transport path 32 therebetween, and can receive the ultrasonic wave from the transmitter 47A. The double feeding detecting sensor 47 detects double feeding of a document D using a principle that the ultrasonic wave from the transmitter 47A attenuates in a gap between two documents D which are doubly fed. Since an attenuation degree of an ultrasonic wave when passing through two or more documents D is larger than an attenuation degree of an ultrasonic wave when passing through one document, if a detection value exceeds (is lower than) a predetermined threshold value (second threshold value SH2 in FIG. 8) due to the large attenuation degree, double feeding is detected. Meanwhile, since an attenuation degree of an ultrasonic wave when passing through one document D is small, there is no case in which a detection value exceeds a predetermined value, and double feeding is not detected. In addition, since a sheet portion 52 of the carrier sheet CS other than the bonding portion 51 is formed of two pieces, and an attenuation degree of the ultrasonic wave which attenuates at a gap between two sheet portions 52 is large, there is a case in which the double feeding detecting sensor 47 erroneously detects the carrier sheet CS as double feeding of a document. For this reason, when reading the document D by interposing the document D in the carrier sheet CS, a user can invalidate a double feeding detection by operating the double feeding detection invalidating switch 25.

In addition, a document presence detecting sensor 48 as an example of a document presence detecting unit which can detect a presence or absence of a document D is disposed between the pair of driving rollers 35A which configures the pair of transport rollers 35.

The document presence detecting sensor 48 in the example is a contact-type sensor which includes a lever (contactor), for example. The document presence detecting sensor 48 is switched from a non-detecting state to a detecting state when the tip end of a document D or a carrier sheet CS pushes the lever, and the lever is switched from a detecting state to a non-detecting state when the rear end of the document D or the carrier sheet CS passes the lever, and the lever is not pressed. Accordingly, the controller 50 detects a state in which the document D or the carrier sheet CS is present (state in which document is present) when the document presence detecting sensor 48 is switched from the non-detecting state to the detecting state, and detects a state in which the document D or the carrier sheet CS is not present (state in which document not present) when the document presence detecting sensor is switched from the detecting state to the non-detecting state. A detection result of the document presence detecting sensor 48 is used when performing a control of determining a start and end timing of a reading operation of the reading unit 40 (40A and 40B) which is disposed on the downstream side in the transport direction Y thereof. In addition, the document presence detecting sensor 48 may be a non-contact sensor such as an optical sensor.

According to the embodiment, a carrier sheet sensor 46 (hereinafter, also referred to as "CS sensor 46") is disposed at a position which is deviated in the width direction X (main scanning direction) which intersects the transport direction Y with respect to each sensor 45 and 48 which is formed of a contact-type sensor. The CS sensor 46 in the example is an optical sensor of which a detecting target is marks 53 and 54 which are provided in the bonding portion 51 of the carrier sheet CS, and a pair thereof is provided in line in the width direction X. The CS sensor 46 is provided with a light emitter and a light receiver on both sides between which a transport path is interposed in a direction orthogonal to a face of the carrier sheet CS which is transported on the transport path, enters a detecting state when light from the light emitter is received by the light receiver, and enters a non-detecting state when light from the light emitter is cut off at an opaque portion of the document or the carrier sheet CS.

The pair of CS sensors 46 includes a first carrier sheet sensor 46A as an example of a sheet detecting unit (also denoted by first CS sensor 46A), and a second carrier sheet sensor 46B as an example of a direction detecting unit (also denoted by second CS sensor 46B). The first CS sensor 46A is disposed so as to be close to the outer side in the width direction X with respect to a center in the width of the transport path, and the second CS sensor 46B is disposed so as to be close to the inside in the width direction X with respect to the center in the width of the transport path. In addition, according to the embodiment, when the CS sensor 46 detects the carrier sheet CS, a double feeding detection based on a detection signal of the double feeding detecting sensor 47 is invalidated.

Figure 4:
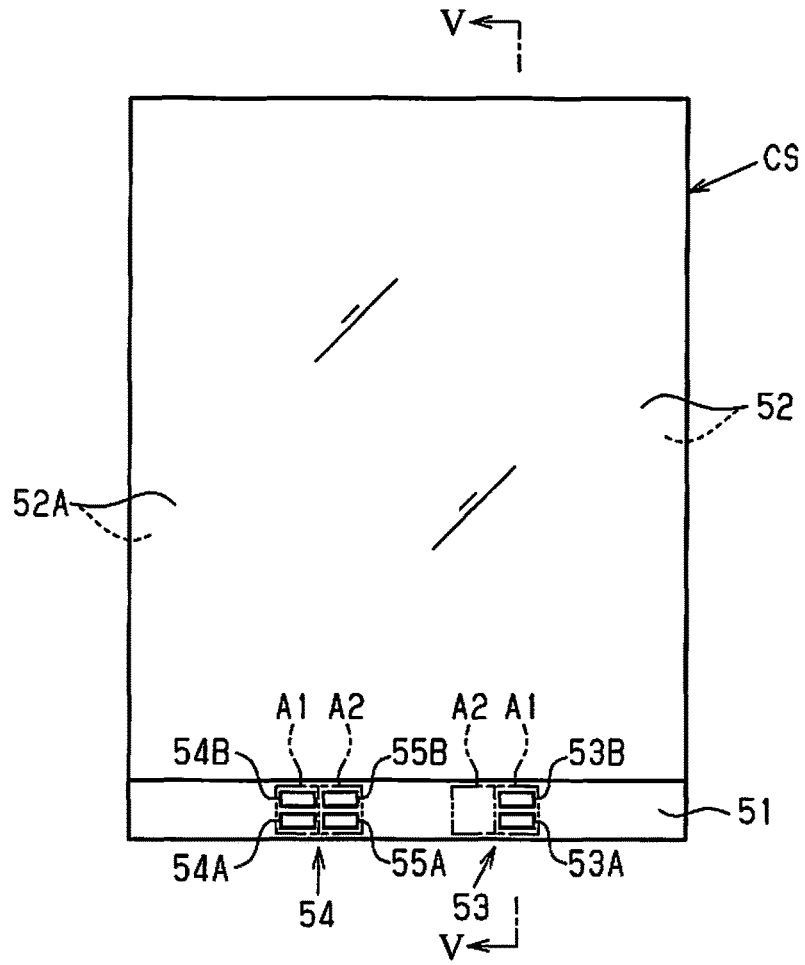
FIG. 4 is a schematic plan view which illustrates a carrier sheet.
Figure 5:
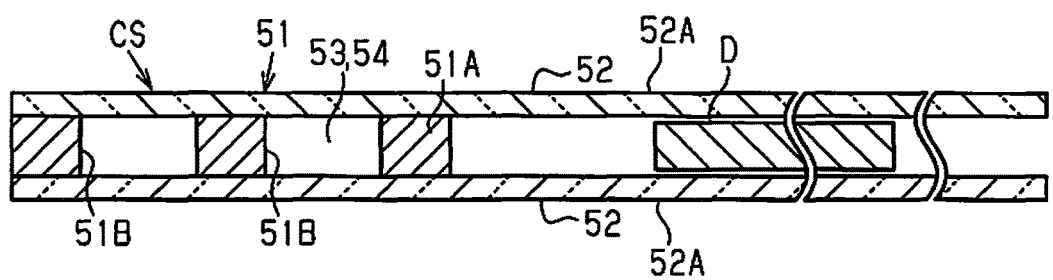
FIG. 5 is a partially ruptured side sectional view which schematically illustrates a carrier sheet in which a document is interposed.

Subsequently, the carrier sheet CS will be described with reference to FIGS. 4 and 5. As illustrated in FIG. 4, the carrier sheet CS includes a belt-shaped bonding portion 51 which is configured of quadrangular sheets 52A of two pieces which is formed of a colorless-transparent synthetic resin, and extends along a side with a constant width (for example, in range of 5 to 20 mm), in which the sheet is bonded at a part of a peripheral edge portion, and two sheet portions 52 which extend from the bonding portion 51. As illustrated in FIG. 5, the carrier sheet CS is used by interposing a document D between the two sheet portions 52. For this reason, the two sheet portions 52 are formed in a size much larger than a size of the document D of a standard size (A4 size, B5 size, or the like) which is used by being interposed therebetween.

The carrier sheet CS is used by being set on the document support 13, and in a direction in which the bonding portion 51 side becomes the head in the transport direction Y. That is, the carrier sheet CS in which a document D is interposed is set in a state in which the bonding portion 51 is inserted into the feeding port 12A. In addition, the set carrier sheet CS is fed into the main body 12 from the bonding portion 51 side. The carrier sheet CS which is fed is transported in the transport direction Y with the bonding portion 51 at the head, along the transport path 32 in the main body 12.

As illustrated in FIG. 5, the bonding portion 51 of the carrier sheet CS is opaque, since an end portion of the two colorless-transparent sheets 52A is bonded through an opaque bonding material 51A, for example. In the bonding portion 51, since there is no gap between the two transparent sheets 52A due to the bonding material 51A which is interposed therebetween, an attenuation degree of an ultrasonic wave when the double feeding detecting sensor 47 sets the bonding portion 51 to a detecting target is relatively small. Meanwhile, at a portion of the sheet portions 52, since there is a gap (air space) between the two transparent sheets 52A, regardless of whether or not the document D is interposed therebetween, an attenuation degree of an ultrasonic wave when the double feeding detecting sensor 47 sets the sheet portion 52 to a detecting target is larger than an attenuation degree of an ultrasonic wave when the bonding portion 51 is set to the detecting target. For this reason, when reading an image by interposing a document D in the carrier sheet CS, there is a case in which the double feeding detecting sensor 47 erroneously detects the sheet portion 52 of the carrier sheet CS as double feeding of the document D.

For this reason, it is necessary for a user to invalidate a double feeding detection, by operating the double feeding detection invalidating switch 25, or the input unit 101 of the host device 100 when using the carrier sheet CS. However, when forgetting to perform an operation of invalidating a double feeding detection, a carrier sheet CS is erroneously detected as double feeding of a document, and it leads to a reading error, or when forgetting to perform an operation of returning a double feeding detection to a valid state from the invalid state after finishing reading of the carrier sheet CS, double feeding of a paper document is not detected when reading the subsequent paper document, and as a result, it causes a failure in reading of a document which is caused by double feeding. In order to solve such a problem, according to the embodiment, the CS sensor 46 which can detect the carrier sheet CS is provided, and when the CS sensor 46 detects the carrier sheet CS, a double feeding detection based on a detection signal of the double feeding detecting sensor 47 is invalidated.

As illustrated in FIGS. 4 and 5, a plurality of marks 53 and 54 are provided in the bonding portion 51 of the carrier sheet CS as a portion to be detected which is detected by the CS sensor 46. The plurality of marks 53 and 54 are disposed at positions which are axial symmetry (bilateral symmetry) in the width direction (horizontal direction) which is parallel to the longitudinal direction of the bonding portion 51 with respect to a center line in the width of the carrier sheet CS. One mark 53 includes two marks 56A and 56B in an area A1 which passes a detection position of the first CS sensor 46A, when the carrier sheet CS is transported in the transport direction Y. In addition, the other mark 54 includes two marks 57A and 57B in an area A2 which passes the detection position of the first CS sensor 46A, when the carrier sheet CS is transported in the transport direction Y.

In addition, the area A2 which passes a detection position of the second CS sensor 46B when the carrier sheet CS is transported in the transport direction Y is set next to the area A1 in the width direction (horizontal direction in FIG. 4) of the carrier sheet CS. The one mark 53 does not have a mark in the area A2, and the other mark 54 has the two marks 57A and 57B which are arranged along the longitudinal direction of the carrier sheet CS (vertical direction in FIG. 4) inside the area A2. Two marks 53A and 53B which are arranged so as to be close to the outer side of the mark 53 in the width direction, and two marks 55A and 54B which are arranged so as to be close to the outer side of the mark 54 in the width direction are overlapped at the same position when the carrier sheet CS is turned inside out, and one CS sensor 46 (first CS sensor 46A) is provided corresponding to the overlapping position.

Figure 9:
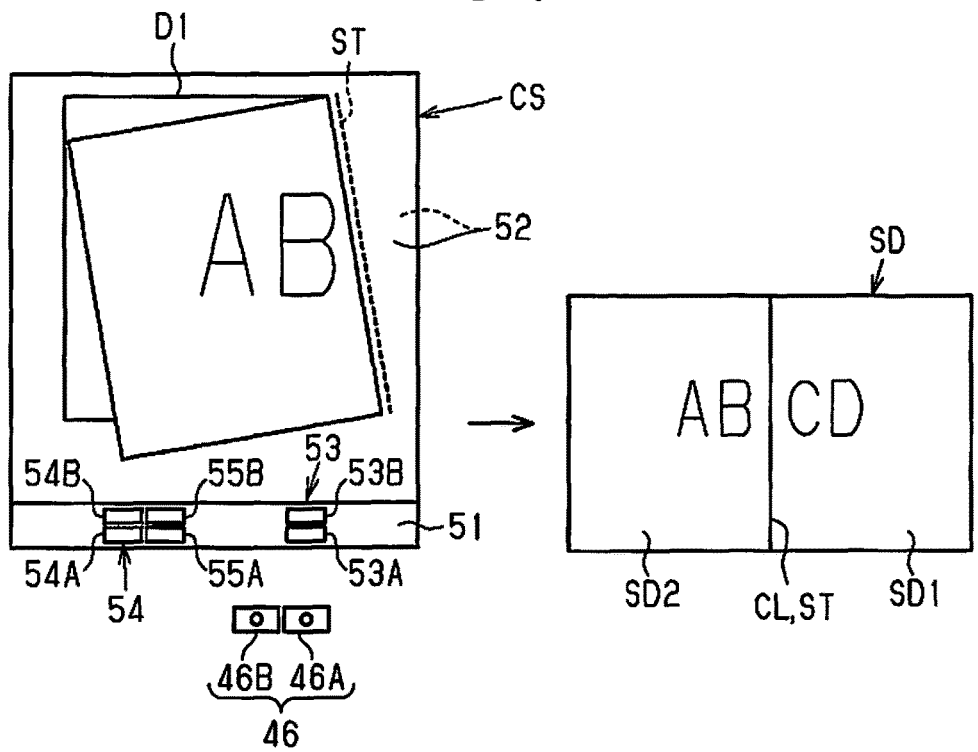
FIG. 9 is a schematic view which describes an example in which two images which are obtained by reading a front face and a rear face of a folded document are properly combined at a side in the stitch direction when a setting direction of a carrier sheet is the forward direction, in a carrier sheet as an example.

The first CS sensor 46A illustrated in FIG. 3 can detect the marks 53A and 53B when a setting direction of the carrier sheet CS at a time of being set in the document support 13 is the forward direction which is illustrated in FIG. 4 (refer to FIG. 9). In addition, the first CS sensor 46A can detect the marks 54A and 54B when setting direction of the carrier sheet CS at a time of being set in the document support 13 is the rearward direction which is turned inside out from the forward direction which is illustrated in FIG. 4 (refer to FIG. 10).

The first CS sensor 46A can detect the mark 53A and 53B when the carrier sheet CS is set in the forward direction, and can detect the marks 54A and 54B when the carrier sheet CS is set in the rearward direction. If the first CS sensor 46A detects the marks 53A and 53B in the area A1 when the carrier sheet CS is set in the forward direction, a reading target is discriminated as the carrier sheet CS. In addition, if the first CS sensor 46A detects the marks 54A and 54B in the area A1 when the carrier sheet CS is set in the rearward direction, a reading target is discriminated as the carrier sheet CS.

In addition, in the second CS sensor 46B, since there is no mark in the area A2 in which the carrier sheet CS is a detecting target when the carrier sheet is transported by being set in the forward direction which is illustrated in FIG. 4, the second CS sensor enters a non-detecting state. For this reason, when the second CS sensor 46B enters a mark non-detecting state in which a mark is not detected, it is discriminated that the carrier sheet CS is in the forward direction. In addition, the second CS sensor 46B detects the mark 55A and 55B in the area A2 in which the carrier sheet CS is a detecting target when the carrier sheet is set in the rearward direction (refer to FIG. 10), and is transported, and enters a mark detecting state. For this reason, when the second CS sensor 46B enters the mark detecting state in which the marks 55A and 55B in the area A2 are detected, it is discriminated that the carrier sheet CS in the rearward direction. In addition, a presence or absence of marks for direction detection in the area A2 of the marks 53 and 54 may be opposite to that in FIG. 4, in marks for detecting the forward direction, and marks for detecting the rearward direction.

As illustrated in FIG. 5, the marks 53 and 54 which are provided in the bonding portion 51 of the carrier sheet CS according to the embodiment are formed as window portions which are colorless and transparent. In the bonding material 51A, for example, portions corresponding to the marks 53 and 54 are formed as a through hole 51B, and the marks 53 and 54 are formed in a transparent window portion when the through hole 51B is covered by a colorless-transparent sheet. The CS sensor 46 enters a detecting state by receiving light which penetrated portions of the marks 53 and 54 in the bonding portion 51 of the carrier sheet CS, and enters a non-detecting state when light is shut off at a portion in which the mark 53 and 54 are not present. Accordingly, the controller 50 detects a tip end of the document D or the carrier sheet CS, and edges of the marks 53 and 54 on the downstream side in the transport direction, when the CS sensor 46 is switched from the non-detecting state to the detecting state. The controller 50 detects a rear end of the document D or the carrier sheet CS, and edges of the marks 53 and 54 on the upstream side in the transport direction, when the CS sensor 46 is switched from the detecting state to the non-detecting state.

Figure 7:
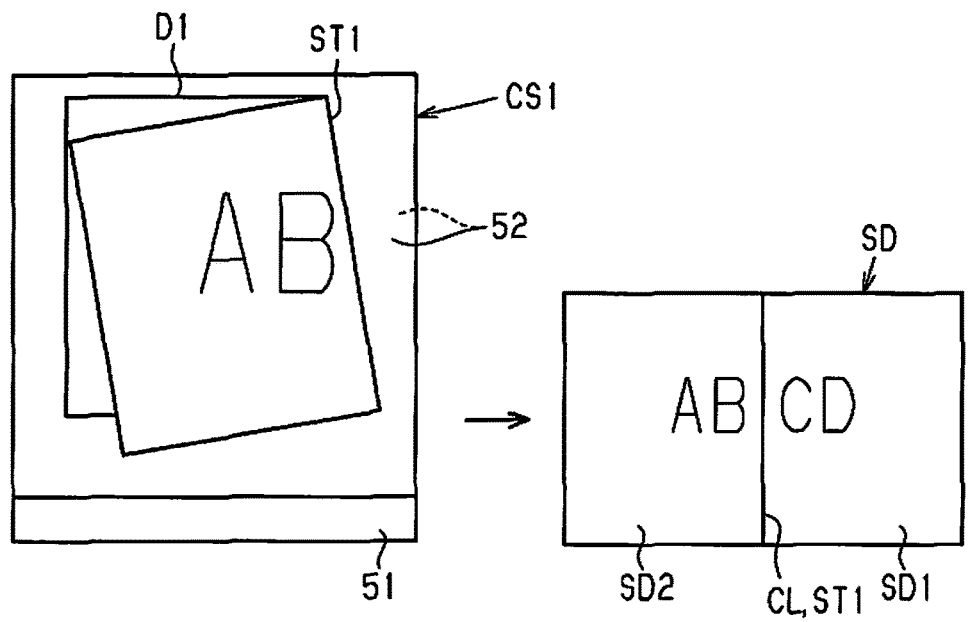
FIG. 7 is a schematic view which describes an example in which two images which are obtained by reading a front face and a rear face of a folded document are combined at a side in a proper stitch direction, in a carrier sheet as a reference example.

FIG. 7 illustrates a carrier sheet CS1 of a reference example, and there is the front face and the rear face in the carrier sheet CS1. In the carrier sheet CS1 in which a folded document D1 is interposed between two sheet portions 52, when the front face is set in a direction of the lower face side, and the bonding portion 51 side is set in a direction of being a head in the transport direction, it is set so that a fold of the folded document D1 is disposed on the right side in FIG. 7. In this case, a front face image SD1 and the rear face image SD2 which are obtained by reading both faces of the folded document D1 are combined, using a binding line CL by setting a side on the right side of the folded document D1 to a stitch ST1, and one combined image is generated. In the example in FIG. 7, the front face image SD1 and the rear face image SD2 are properly combined.

Figure 8:
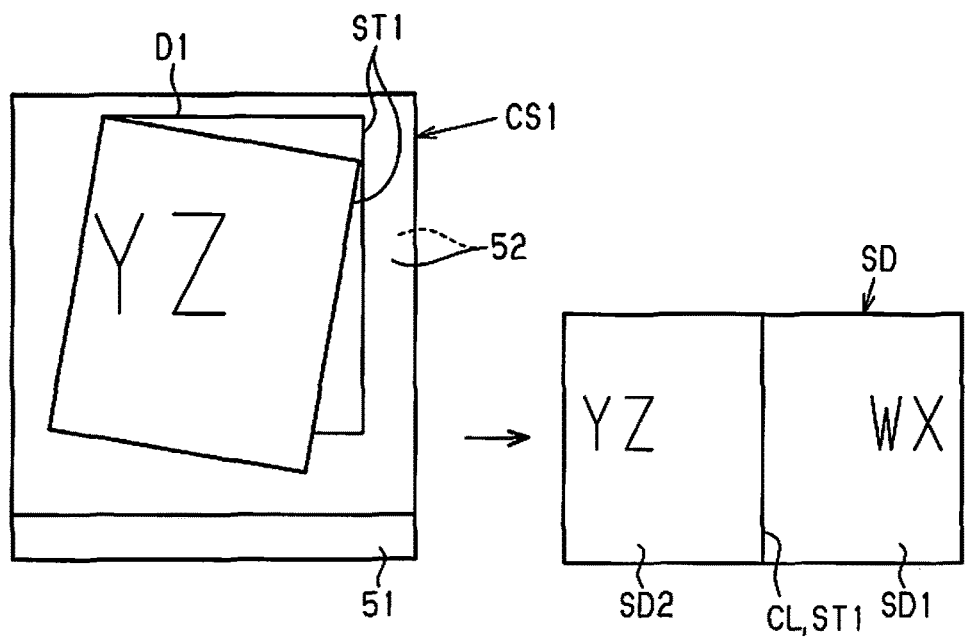
FIG. 8 is a schematic view which describes an example in which two images which are obtained by reading a front face and a rear face of a folded document are combined at a side which is different from the side in the stitch direction, in a carrier sheet as a reference example.

Meanwhile, even when the folded document D1 is set in the carrier sheet CS1 so that a fold thereof is disposed on the right side, similarly to that in FIG. 7, for example, as illustrated in FIG. 8, there is a case in which the carrier sheet CS1 is set in a direction in which the front face becomes a top face side, by mistaking the front face for the rear face when setting the carrier sheet CS1. In this case, as illustrated in FIG. 8, a side on the right side of the folded document D1 is set to the stitch ST1, the front face image SD1 and the rear face image SD2 which are read are combined, using the binding line CL by setting the side on the right side to the stitch ST1, and one combined image SD is generated. For this reason, a wrong combined image SD which is obtained by combining the front face image SD1 and the rear face image SD2 using a side which is different from the actual fold as the stitch ST1 is generated.

Figure 10:
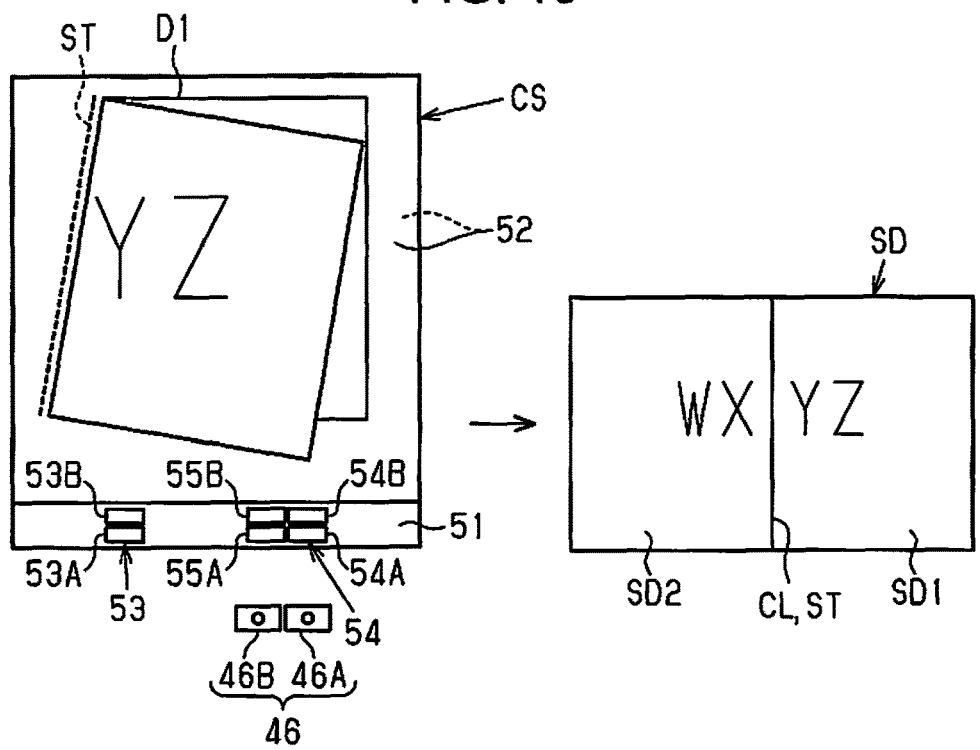
FIG. 10 is a schematic view which describes an example in which two images which are obtained by reading a front face and a rear face of a folded document are properly combined at a side in the stitch direction when a setting direction of a carrier sheet is the rearward direction, in a carrier sheet as an example.

As illustrated in FIG. 9, also in the carrier sheet CS in the embodiment, a disposition in a direction of a fold (stitch ST) of the folded document D1 is predetermined between the right side and the left side. For this reason, a direction of the stitch ST is reversed on the left and right sides in a case in which the carrier sheet CS is set in the forward direction, as illustrated in FIG. 9, and a case in which the carrier sheet CS is set in the rearward direction, as illustrated in FIG. 10. As illustrated in FIG. 9, as a result of detecting the marks 53A and 53B using the first CS sensor 46A, it is detected as the carrier sheet CS. In addition, since the second CS sensor 46B is in the mark non-detecting state of not detecting the mark, a setting direction of the carrier sheet CS is detected to be the forward direction. In this case, a side on the right side of the folded document D1 in FIG. 9 is assumed to be the stitch ST, and the front face image SD1 and the rear face image SD2 are combined, using the binding line CL which corresponds to the stitch ST. For this reason, the front face image SD1 and the rear face image SD2 are combined as one combined image SD which is the same image as that when the folded document D1 is opened.

Meanwhile, as illustrated in FIG. 10, in a case in which the carrier sheet CS is set in the rearward direction, as a result of detecting the marks 54A and 54B using the first CS sensor 46A, it is detected as the carrier sheet CS. In addition, since the second CS sensor 46B detects the marks 55A and 55B, it is detected that a setting direction of the carrier sheet CS is the rearward direction. In a case of detecting the rearward direction in this manner, a side on the left side of the folded document D1 in FIG. 10 is assumed to be the stitch ST, and the front face image SD1 and the rear face image SD2 are combined as one combined image SD by setting the side on the left side to the binding line CL.

As a result, the combined image SD which is the same as an image obtained when the folded document D1 is opened is obtained.

Subsequently, an electrical configuration of the image reading apparatus 11 will be described with reference to FIG. 6. As denoted in FIG. 6, the controller 50 is provided with a computer 60 which is configured of a microprocessor, or the like, a storage unit 61, an input unit 62 which is formed of an interface to which various data or a signal is input from the host device 100, and an output unit 63 which is formed of an output interface from which read data which is read by the image reading apparatus 11 is output to the host device 100. In addition, the controller 50 is provided with a timing generator 64 (hereinafter, also denoted by "TG 64") which outputs a pulse signal regulating various operation timings which includes a reading operation of a pixel signal to the image sensors 42A and 42B. In addition, the controller 50 is provided with an analog front end 65 (hereinafter, also denoted by "AFE 65") which performs analog/digital conversion (A/D conversion) with respect to the pixel signal which is input from the image sensors 42A and 42B. The storage unit 61 is configured of a non-volatile memory, and a RAM, for example.

The image reading apparatus 11 is connected to the host device 100 through a communication cable. The host device 100 is configured of a personal computer (hereinafter, also referred to as "PC"), for example, and is provided with the input unit 101 and a display unit 102. In addition, the host device 100 is not limited to PC, and may be a smart device such as a mobile information terminal (PDA (Personal Digital Assistants)), a tablet PC, or a smart phone.

Figure 6:
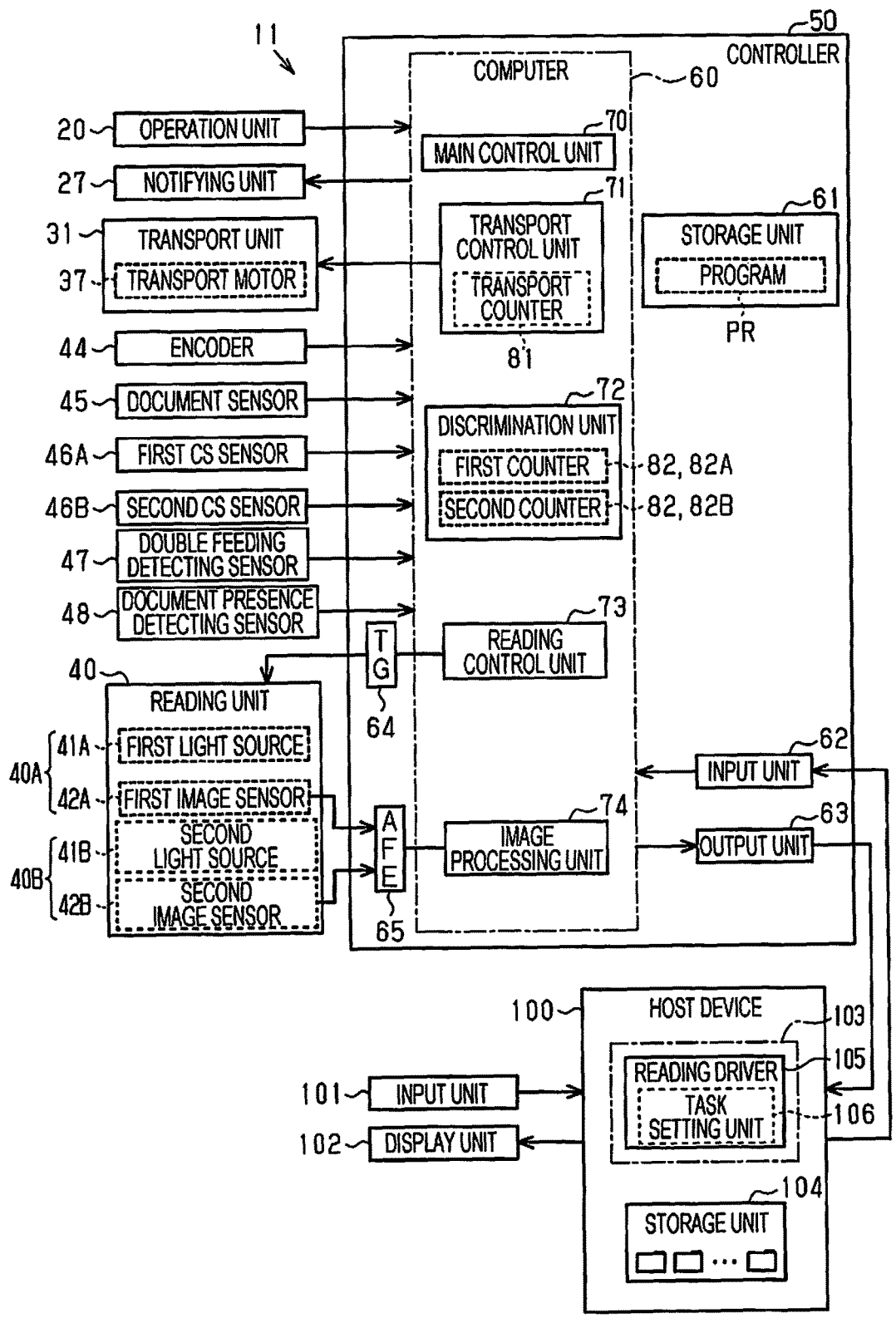
FIG. 6 is a block diagram which illustrates an electrical configuration and a functional configuration of the image reading apparatus.

As denoted in FIG. 6, a computer 103 and a storage unit 104 are built in the host device 100. The computer 103 is provided with a reading driver 105. The reading driver 105 is configured of software which is installed in the host device 100.

The reading driver 105 is provided with a task setting unit 106 which sets validity/invalidity of a double feeding detection. The task setting unit 106 receives setting information of validity/invalidity of a double feeding detection which is instructed by an operation of the input unit 101 by a user, transmits the received setting information to the image reading apparatus 11, and sets the setting information in the main control unit 70 as an example of the processing unit. Setting of the setting information also can be performed by a user, by operating the double feeding detection invalidating switch 25 of the image reading apparatus 11. That is, the main control unit 70 of the image reading apparatus 11 sets the setting information of validity/invalidity of a double feeding detection which is instructed when a user operates the double feeding detection invalidating switch 25. In addition, the user sets setting conditions (task condition) related to image reading processing by operating the input unit 101. In the setting conditions, a reading condition including a reading resolution, a reading color, single-side reading, double-side reading, or the like, a stitch direction which is necessary when combining two images at a time of reading both faces of a folded document, image processing conditions including a shading correction, a gamma correction, or the like, and a storing condition including a storage format, a transferring method, and a storage destination of image data are included.

In the image reading apparatus 11 according to the embodiment, there is 300 dpi/600 dpi in the reading resolution, and there is monochrome (grayscale)/color in the reading color, for example. In addition, the stitch direction is a condition which regulates whether a side at which two images obtained by reading both faces of a folded document which is interposed in the carrier sheet CS are bonded is to be the left side or the right side. In the storage format, there is a PDF format, a JPEG format, a GIF format, or the like. In addition, in the transfer method, there is a transfer to the host device 100, and a mail transfer, and as the storage destination, an address of a folder in the storage unit 104 in the host device 100, or a mail address of a mail transfer destination are designated. In addition, the setting conditions may be set when a user operates the operation unit 20 of the image reading apparatus 11.

Figure 15:
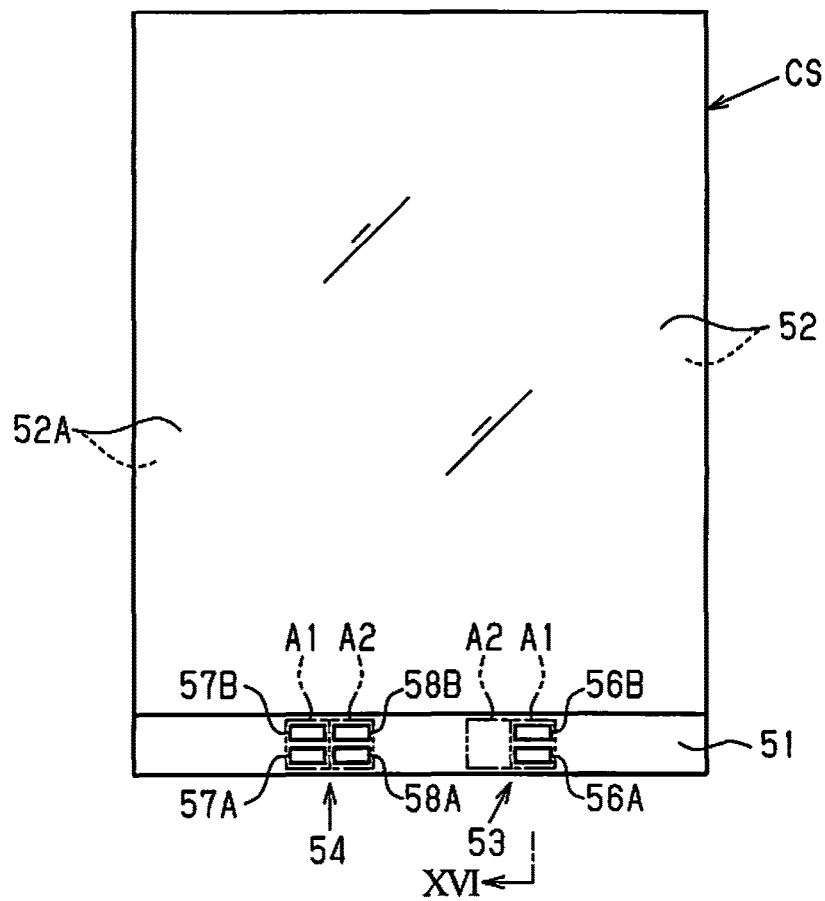
FIG. 15 is a schematic plan view which illustrates a carrier sheet in a modification example.

A program PR, or the like, including a program for discrimination processing of a carrier sheet, which is described in a flowchart in FIG. 15 is stored in a storage unit 61 denoted in FIG. 6. A computer 60 which is denoted in FIG. 6 functions as various functional units in the figure, by executing the program PR. That is, as denoted in FIG. 6, the computer 60 is provided with the main control unit 70, a transport control unit 71 which controls the transport motor 37, the discrimination unit 72 which discriminates whether a transport target is the carrier sheet CS or a non-carrier sheet, a reading control unit 73 which controls the reading unit 40, and an image processing unit 74 which performs various image processing, or the like, with respect to read data, as functional units. In addition, as the non-carrier sheet, there is a document D, a credit card, or the like.

The transport control unit 71 drives the transport motor 37 according to an instruction from the main control unit 70, and feeds a reading target (hereinafter, also referred to as "reading sheet") which is set on the document support 13 to the inside of the main body 12 sheet by sheet, by rotating the plurality of pair of rollers 33 to 36. In addition, the transport control unit 71 transports the fed transport target along the transport path 32 at a constant transport speed corresponding to the reading condition. In the transport target, the carrier sheet CS, and a non-carrier sheet other than the carrier sheet are included. In the non-carrier sheet, a document D, a credit card, or the like, is included.

The discrimination unit 72 is provided with a plurality of counters 82. The counter 82 is provided with a first counter 82A which counts a distance or the number of marks related to the marks 53A and 53B, or the marks 54A and 54B which are detected in the area A1 of the carrier sheet CS using the first CS sensor 46A, and a second counter 82B which counts the number of marks which are detected in the area A2 of the carrier sheet CS using the second CS sensor 46B. In the example, an example in which the first counter 82A measures a distance related to the mark will be described.

Figure 11:
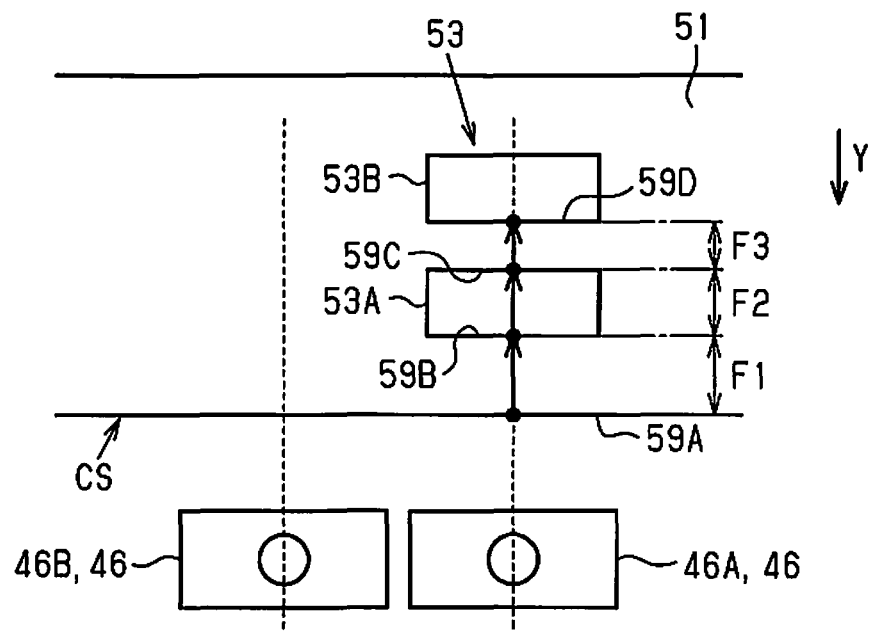
FIG. 11 is a schematic view which describes detecting processing of a carrier which is set in the forward direction.
Figure 12:
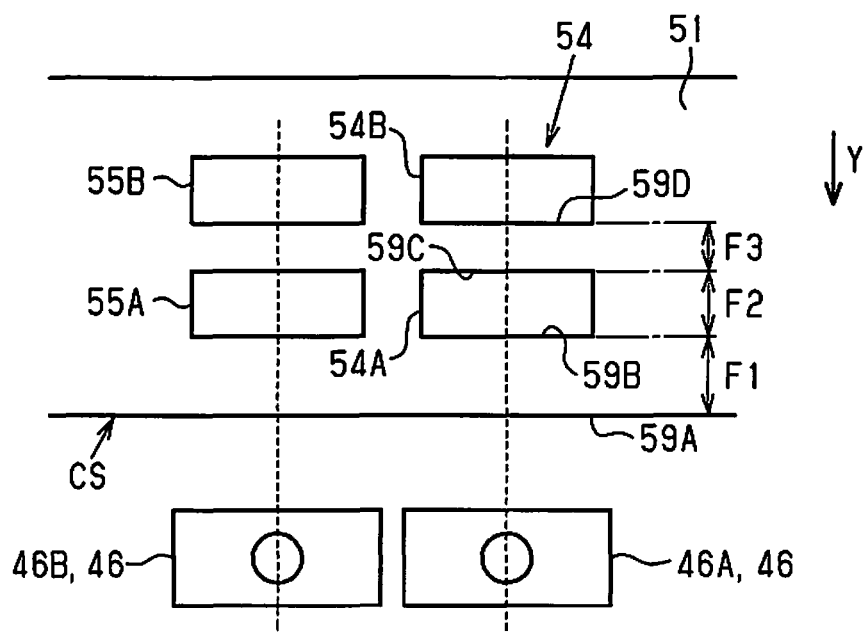
FIG. 12 is a schematic view which describes detecting processing of a carrier sheet which is set in the rearward direction.

A distance related to the mark will be described with reference to FIGS. 11 and 12. FIG. 11 illustrates a process of detecting the marks 53A and 53B of the carrier sheet CS which is set in the forward direction, and FIG. 12 illustrates a process of detecting the marks 54A and 54B of the carrier sheet CS which is set in the rearward direction. In addition, since detecting processes of the mark in the forward direction and the rearward direction are basically the same, hereinafter, a mark detecting process at a time of the forward direction will be described.

The first CS sensor 46A illustrated in FIG. 11 switches from a detecting state to a non-detecting state when detecting a downstream end (tip end) of the carrier sheet CS in the transport direction Y. The computer 60 causes the first counter 82A to start counting of the number of pulse edges of a detection signal which is input from the encoder 44, when the first CS sensor 46A is switched from the detecting state to the non-detecting state. The number of pulse edges of the detection signal of the encoder 44 is proportional to a transport distance of the carrier sheet CS which is a reading target. For this reason, the first counter 82A counts a distance from a tip end of the carrier sheet CS to a direction in which the carrier sheet goes toward the upstream side in the transport direction Y. When the first CS sensor 46A is switched from the non-detecting state to the detecting state, the first CS sensor obtains a discrete value of the first counter 82A at the time as a first distance F1, and resets the first counter 82A.

In addition, the first counter 82A continuously counts the number of pulse edges of a detection signal of the encoder 44. When the first CS sensor 46A is switched from the detecting state to the non-detecting state subsequently, the first CS sensor obtains a discrete value of the first counter 82A at the time as a second distance F2, and resets the first counter 82A. The second distance F2 corresponds to a distance from an edge 59B on the downstream side of the mark 53A in the transport direction Y to an edge 59C on the upstream side in the transport direction Y, that is, a width of the mark 53A.

In addition, the first counter 82A continuously counts the number of pulse edges of a detection signal of the encoder 44. When the first CS sensor 46A is switched from a non-detecting state to a detecting state subsequently, the first CS sensor obtains a discrete value of the first counter 82A at the time as a third distance F3, and resets the first counter 82A. The third distance F3 corresponds to a distance from the edge 59C on the upstream side of the mark 53A in the transport direction Y to the edge 59D on the downstream side of the subsequent mark 53B in the transport direction Y.

When measuring each distance F1 to F3, the upper limit value is set in advance. The computer 60 determines that a reading target is a non-carrier sheet other than the carrier sheet CS, in a case in which a detecting state of the first CS sensor 46A is not switched, even when a discrete value of the first counter 82A does not exceed the upper limit value. For example, a paper document, a credit card, or the like, is discriminated as the non-carrier sheet.

The second CS sensor 46B which is illustrated in FIG. 11 performs a mark detecting process by setting the area A2 (refer to FIG. 4) of the carrier sheet CS to a detecting target. As illustrated in FIG. 11, when the second CS sensor 46B enters a mark non-detecting state in which a mark is not detected in a section in which the first CS sensor 46A is detecting a mark, the computer 60 determines that a carrier sheet CS which is discriminated based on a mark detection result of the first CS sensor 46A at the time is set in the forward direction. Meanwhile, as illustrated in FIG. 12, when the second CS sensor 46B enters a mark detecting state in which a mark is detected in a section in which the first CS sensor 46A is detecting a mark, the computer 60 determines that a carrier sheet CS which is discriminated based on a mark detection result of the first CS sensor 46A at the time is set in the rearward direction. In addition, a plurality of marks (two in the example) are set as detecting targets of the first CS sensor 46A and the second CS sensor 46B. The reason for setting the number of marks as a detecting target to be plural is that, when there is one mark, there is a concern that a punch hole which is perforated in a paper document may be erroneously detected as a mark. In addition, the reason for measuring a distance related to a mark, instead of counting the number of marks is that, when counting the number, there is a concern of an erroneous detection in a case in which there are a plurality of punch holes; however, when it is a distance related to a mark, it is easier to avoid an erroneous detection of a punch hole, compared to a case in which only the number of marks is detected.

The double feeding detecting sensor 47 in the example is provided with a transmitter 47A which transmits an ultrasonic wave as illustrated in FIG. 3, and a receiver 47B which receives the ultrasonic wave transmitted from the transmitter 47A, for example. The ultrasonic wave which is transmitted from the transmitter 47A attenuates when passing through a reading target such as a document D, and the receiver 47B receives the attenuated ultrasonic wave. In addition, the double feeding detecting sensor 47 outputs a detection signal with a detection value of a magnitude which is proportional to, for example, amplitude of the received ultrasonic wave of the receiver 47B. In addition, the main control unit 70 performs double feeding error detecting processing based on the detection signal of the double feeding detecting sensor 47, and when a double feeding error occurs, a purport thereof is notified to a user using lighting or flickering of an alarm lamp, and displaying of a message on the display unit 102 of the host device 100. In addition, the double feeding detecting sensor 47 according to the embodiment is configured so that, when attenuation of an ultrasonic wave which is received by the receiver 47B is large, a detection value becomes small; however, in contrast to this, it may be a configuration in which, when attenuation of an ultrasonic wave is large, a detection value becomes large.

The reading control unit 73 is provided with a timing generator (TG) 64 which outputs a pulse signal for regulating an operation timing of various operations which includes a reading operation of a pixel signal with respect to the image sensor 42, and an analog front end (AFE) 65 which performs an analog/digital conversion (A/D conversion) with respect to the pixel signal which is input from the image sensor 42. In addition, the reading control unit 73 inputs read data through the AFE 65.

The reading control unit 73 controls light emitting of the light source 41 through a light source driving unit, and radiates light to a reading area of a document D. The reading control unit 73 controls the reading unit 40 through TG 64, and causes the reading unit to read an image of the document D in the middle of transporting thereof. An analog image signal which is read by the reading unit 40 is converted into a digital signal in AFE 65, and is input to the image processing unit 74. The image processing unit 74 performs well-known correction processing such as a shading correction, a gamma correction, or the like, with respect to the digital image signal which is input, and generates image data of the document D. The image data is transferred to the host device 100 from the controller 50 through a communication cable (not illustrated). In addition, the host device 100 as a transfer destination of the image data is not limited to a personal computer (PC), and may be a smart device, or the like, such as a mobile information terminal (PDA (Personal Digital Assistants)), or a smart phone.

Task conditions corresponding to a setting direction (whether forward direction or rearward direction) of a carrier sheet CS are stored in the storage unit 61, in addition to the program PR. That is, a task condition which is linked with a detection result in a forward direction when the carrier sheet CS is set in the forward direction, and a task condition which is linked with a detection result in a rearward direction when the carrier sheet CS is set in the rearward direction are stored. Accordingly, when a user uses the carrier sheet CS, it is possible to give the image reading apparatus 11 an instruction of a task condition which is linked with a setting direction of the carrier sheet CS to, by selecting a direction from among the forward direction and the rearward direction.

Here, the task condition includes at least one of a reading resolution, a reading color, a stitch direction of a folded document, and a storage destination and a storage format of read data. Specifically, according to the embodiment, as the task condition, all of the reading resolution, the reading color, the stitch direction of a folded document, and the storage destination and the storage format of read data are set.

In the reading resolution, there are 300 dpi, and 600 dpi, for example. As a reading color, there is a color and monochrome (grayscale). In the stitch direction of a folded document, there is a right direction and a left direction according to a position of a fold, since positions of the fold of the folded document are opposite in left and right when the carrier sheet CS is set in the forward direction and the rearward direction, in a case in which a carrier sheet CS in which the folded document is interposed in a predetermined direction is fed by being set in the forward direction or the rearward direction. As a storage destination of read data, one of a plurality of folders in the storage unit 104 on the host device 100 side is selected as the storage destination of the read data. As a storage format, one preset data format among various data formats which are used as formats of image data of a document which is read in the image reading apparatus 11, such as a PDF format, or a bitmap format is selected.

Subsequently, operations of the image reading apparatus 11 will be described.

A user mounts a document D on the document support 13 when causing the image reading apparatus 11 to read the document D. For example, when causing the image reading apparatus 11 to read an image of a booklet document such as a passport or a bank book, or a folded document such as a resume, the document D is interposed in the carrier sheet CS, and the carrier sheet CS in which the document D is interposed is set on the document support 13.

A user sets the carrier sheet CS, performs an operation of setting reading conditions as necessary, thereafter, and instructs the image reading apparatus 11 to read the document, by pressing the start switch 22 of the image reading apparatus 11, or operating the input unit 101 of the host device 100.

Figure 13:
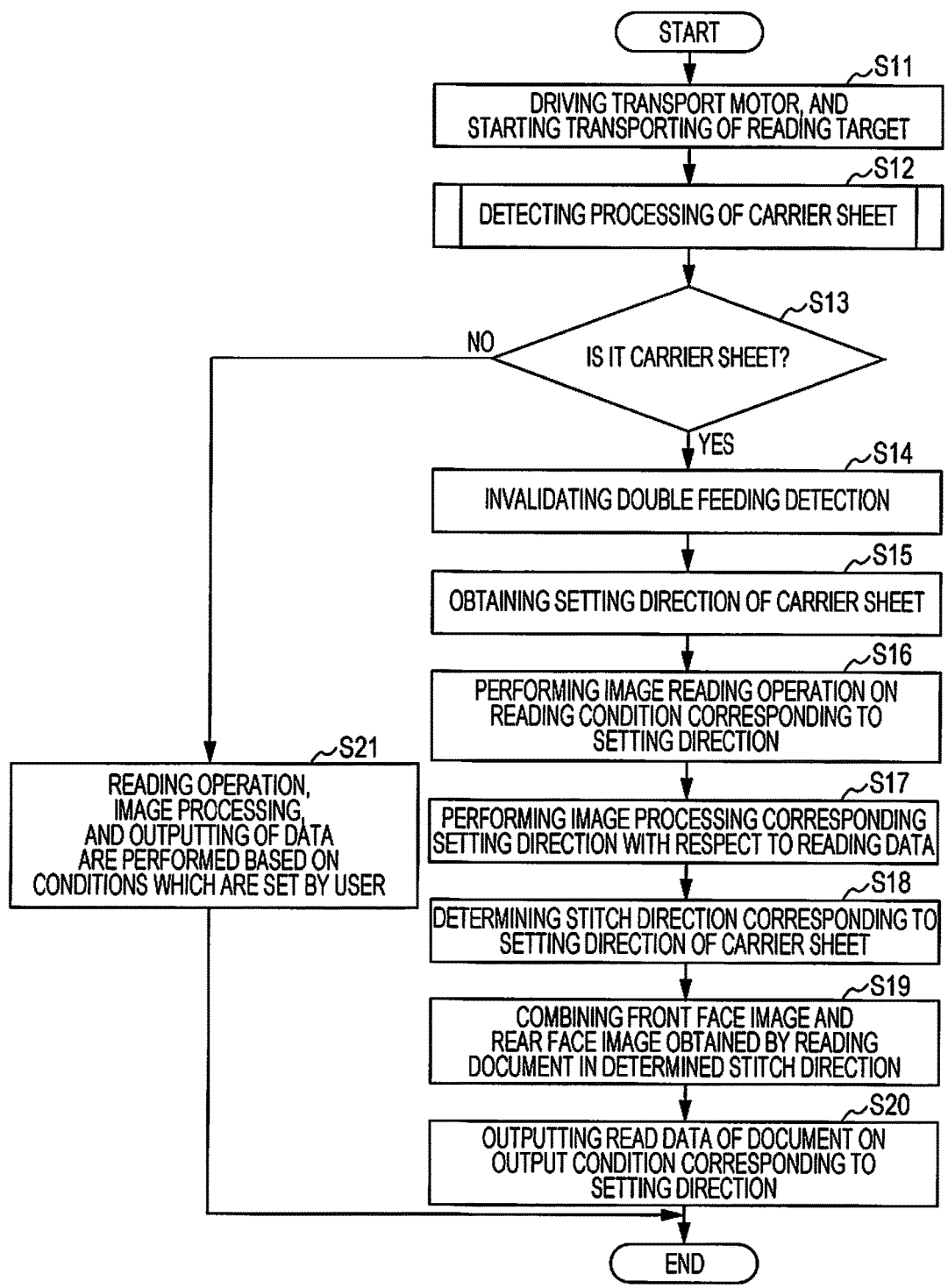
FIG. 13 is a flowchart which illustrates image reading processing.

The computer 60 in the image reading apparatus 11 executes the program PR including a flowchart which is illustrated in FIG. 13, when receiving an instruction of starting scanning in which reading of a reading target such as a document or a carrier sheet CS is started. Hereinafter, image reading processing which is performed by the computer 60 will be described with reference to the flowchart illustrated in FIG. 13. In addition, validity/invalidity of a double feeding detection in which double feeding is detected based on a detection value of the double feeding detecting sensor 47 can be set when a user operates the operation unit 20, or the input unit 101 of the host device 100; however, in the following descriptions, it is assumed that a double feeding detection is set to be valid at the beginning.

First, in step S11, the transport motor is driven, and transporting of a reading target is started. According to the embodiment, processing in step S11 corresponds to an example of a transporting step.

Figure 14:
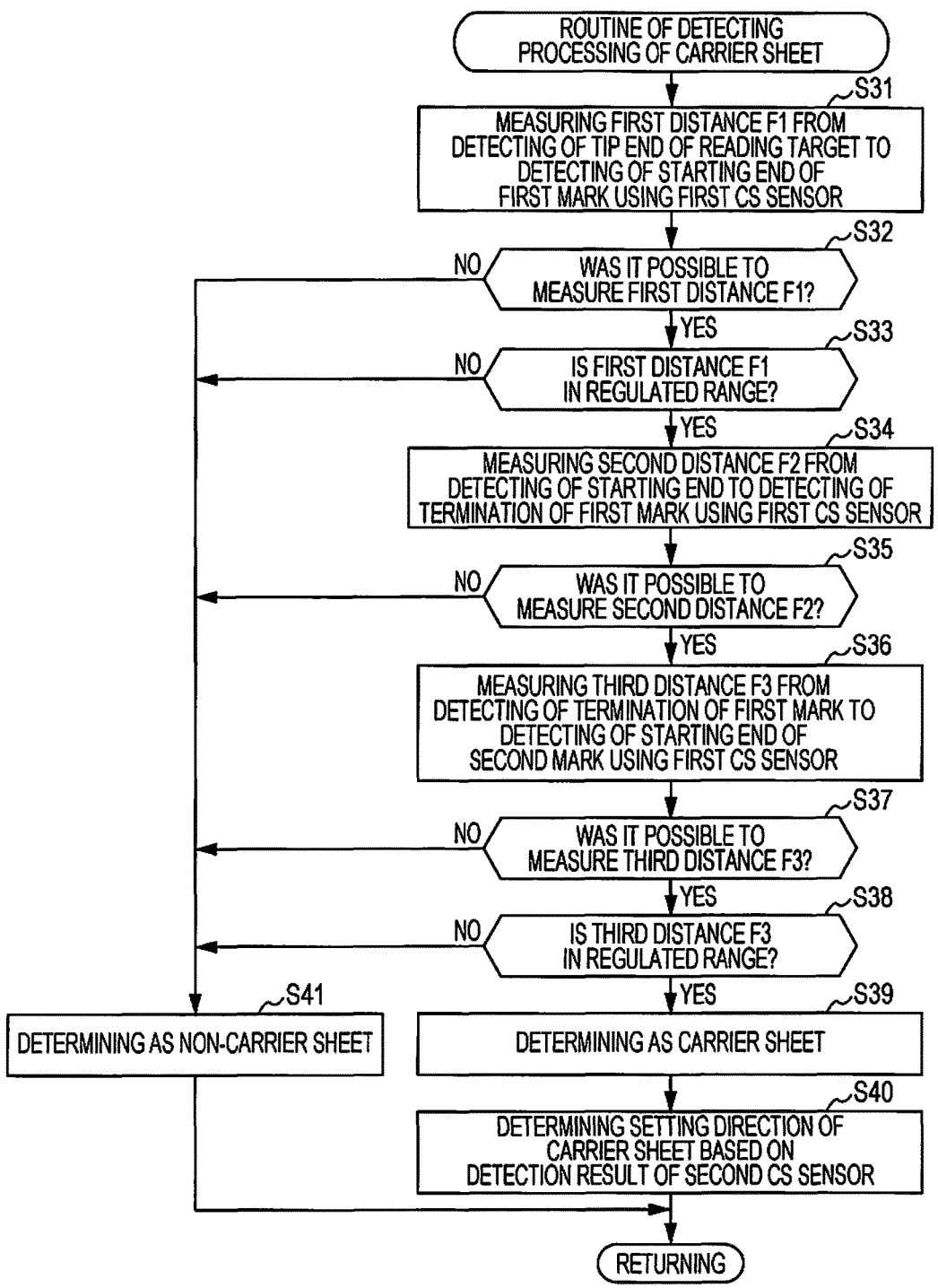
FIG. 14 is a flowchart which illustrates a routine of carrier sheet detecting processing.

In step S12, detecting processing of a carrier sheet is performed. That is, the computer 60 executes a routine of carrier sheet detecting processing which is illustrated in FIG. 14. In the carrier sheet detecting processing, distances F1 to F3 related to the mark 53 or 54 as an example of a portion to be detected are measured, using the counter 82, based on a detection result of the CS sensor 46. A detail of the carrier sheet detecting processing will be described later. In addition, according to the embodiment, processing in step S12 corresponds to an example of a detecting step.

In step S13, whether or not it is a carrier sheet is determined. Specifically, when the measured results of the distances F1 to F3 which are obtained in the carrier sheet CS detecting processing are appropriate for conditions of the carrier sheet CS, it is discriminated that a reading target at the time is the carrier sheet CS. When the reading target is the carrier sheet CS, the process proceeds to step S14, and when the reading target is not the carrier sheet CS, the process proceeds to step S21.

In step S14, a double feeding detection is invalidated. Here, in the double feeding detection, whether or not a detection value of the double feeding detecting sensor 47 exceeds a threshold value for determining double feeding is determined, double feeding is not detected when the detection value does not exceed the threshold value, and double feeding is detected when the detection value exceeds the threshold value. In the example, the double feeding detection which is performed based on the detection value of the double feeding detecting sensor 47 is invalidated. In addition, it may be a configuration in which a double feeding detection is indirectly invalidated, by stopping an output of a detection value by turning off the double feeding detecting sensor 47.

In step S15, whether the carrier sheet is set in the forward direction or in the rearward direction is obtained. That is, the computer 60 determines whether the carrier sheet CS is set in the forward direction or in the rearward direction based on a detection result of the second CS sensor 46B of which a detecting target is the second area A2. For example, as illustrated in FIG. 9, in a case in which a detection result of the second CS sensor 46B is a mark non-detecting state, it is determined that the carrier sheet CS is set in the forward direction. Meanwhile, as illustrated in FIG. 10, in a case in which a detection result of the second CS sensor 46B is a mark detecting state in which the marks 55A and 55B are detected, it is determined that the carrier sheet CS is set in the rearward direction.

In step S16, an image reading operation is performed on a reading condition corresponding to a setting direction. That is, in the storage unit 61, a reading task is set on a task condition which is correlated with a setting direction (whether forward direction or rearward direction) of the carrier sheet CS. That is, when a setting direction of the carrier sheet CS is the forward direction, a first reading task is set, and when a setting direction of the carrier sheet CS is the rearward direction, a second reading task is set. Here, the reading task includes reading conditions, image processing conditions, and output conditions. In the reading conditions, a reading resolution, a reading color, and the like, are included. In the image processing conditions, a cutting condition of an image of a document from a carrier sheet image, and image correction processing in which coloration such as yellow tint, a hurt, or the like, of the carrier sheet CS, for example, is eliminated from an image of a document which is read together with the carrier sheet are included, in addition to well-known image processing such as a shading correction, a gamma correction, or the like. In addition, in step S16, an image reading operation is performed on a reading condition corresponding to a setting direction of the carrier sheet CS is performed. For example, in a case in which the setting direction is the forward direction, a reading resolution of a "high resolution", a reading color of "color", and a reading condition of double-side scanning are set.

On the other hand, in a case in which the setting direction is the rearward direction, a reading resolution of a "low resolution", a reading color of "monochrome", and a reading condition of single-side scanning are set. In addition, according to the embodiment, processing in step S16 corresponds to an example of a reading step.

In step S17, image processing corresponding to a setting direction is performed with respect to the read data. The image processing unit 74 of the computer 60 performs image processing corresponding to a setting direction with respect to the read data. For example, when it is the forward direction, a gamma correction is performed by using a first gamma value, and when it is the rearward direction, a gamma correction is performed by using a second gamma value. In addition, an image of a document which is read along with a carrier sheet is subjected to first image correction processing which includes a process of removing coloration such as yellow tint of the carrier sheet CS, and a process of removing a hurt, or the like, when it is the forward direction, for example, and is subjected to a second image correction processing in which at least one of the process of removing coloration such as yellow tint of the carrier sheet CS and the process of removing a hurt, or the like, is not performed, when it is the rearward direction. In this manner, different image processing is performed with respect to the read data according to a setting direction (whether forward direction or rearward direction) of the carrier sheet CS.

In step S18, a stitch direction corresponding to a setting direction of the carrier sheet is determined.

That is, when a setting direction of the carrier sheet CS is the forward direction which is illustrated in FIG. 9, a direction is determined by setting a side on the right side (in FIG. 9, side on side to which dashed line is attached) of a folded document D1 in the carrier sheet CS in FIG. 9 to a stitch. On the other hand, when the setting direction is the rearward direction which is illustrated in FIG. 10, a direction is determined by setting a side on the left side (in FIG. 10, side on side to which dashed line is attached) of the folded document D1 in the carrier sheet CS in FIG. 10 to a stitch. In addition, according to the embodiment, the processing in step S18 corresponds to an example of a combining direction specifying step.

In step S19, a front face image and a rear face image which are obtained by reading a document are combined in a determined stitch direction. That is, the computer 60 combines a front face image which is read by the first reading unit 40A, and rear face image which is read by the second reading unit 40B in a determined stitch direction. For example, in the example illustrated in FIG. 9, the right side (first side) of the folded document D1 in the carrier sheet CS is assumed as the stitch ST, and a combined image SD is generated by bonding the front face image SD1 and the rear face image SD2 by setting the right side to a bonding line CL. In addition, in the example illustrated in FIG. 10, the left side (second side) of the folded document D1 in the carrier sheet CS is assumed as the stitch ST, and a combined image SD is generated by bonding the front face image SD1 and the rear face image SD2 by setting the left side to a bonding line CL. In addition, according to the embodiment, processing in step S19 corresponds to an example of an image processing step.

In step S20, document read data is output on an output condition corresponding to a setting direction. That is, the main control unit 70 of the computer 60 outputs document read data which is generated by the image processing unit 74 on an output condition corresponding to the setting direction. In the output condition, a data format (file format) when outputting the document read data, or when storing the document read data in an output destination, and a storing method are included.

In the storing method, there are a method of storing the document read data in a designated folder of the storage unit 104 of the host device 100, and a method of performing a mail transfer with respect to a terminal of the storage destination from the host device 100.

For example, when the carrier sheet CS is in the forward direction, read data is converted into a PDF format, and is stored in the designated folder in the host device 100. On the other hand, when the carrier sheet CS is in the rearward direction, the read data is converted into a JPEG format, and the read data is transferred to a designated terminal through the host device 100 as a mail.

In step S21, a reading operation, image processing, and a data output are performed based on conditions which are set by a user. That is, in a case in which a reading target is a document of a non-carrier sheet such as a paper document or a credit card, the reading operation, the image processing, and the data output of the document D are performed based on a task condition which is set in the image reading apparatus 11, or in the reading driver 105 of the host device 100 by a user.

Subsequently, a detail of a carrier sheet detecting processing in step S12 illustrated in FIG. 13 will be described with reference to FIG. 14. As illustrated in FIGS. 11 and 12, the carrier sheet detecting processing is performed when measuring each of the distances F1 to F3 by counting the number of pulse edges of a detection signal of the encoder 44 in the first counter 82A, by setting switching of a detecting state of the first CS sensor 46A to a trigger. In a case in which it is not possible to measure any one of the distances F1 to F3, it is determined that a reading target is a non-carrier sheet. In addition, it is possible to discriminate a setting direction (whether forward direction or rearward direction) in a case of the carrier sheet CS, in addition to discriminating of whether it is the carrier sheet CS or a non-carrier sheet, by performing the carrier sheet detecting processing.

First, in step S31, the first distance F1 from detecting of a tip end of a reading target to detecting of a starting end of the first mark is measured by the first CS sensor. The first CS sensor 46A illustrated in FIG. 11 is switched from a detecting state to a non-detecting state when detecting a downstream end (tip end) of the carrier sheet CS in the transport direction Y. When the first CS sensor 46A switches from the detecting state to the non-detecting state, the first counter 82A starts counting of the number of pulse edges of a detection signal which is input from the encoder 44, that is, measuring of the first distance F1. In addition, the first CS sensor 46A performs measuring until the state is switched from the non-detecting state to the detecting state. In addition, in a case in which it is possible to measure the first distance F1, the first counter 82A is reset, after a value of the first distance F1 is read.

In step S32, whether or not the first distance F1 can be measured is determined. The computer 60 determines that it was possible to measure the first distance F1 when the first CS sensor 46A is switched from the non-detecting state to the detecting state, before a discrete value of the first counter 82A exceeds an upper limit value. For this reason, in a case in which the first CS sensor 46A is not switched from the non-detecting state to the detecting state, even when the discrete value of the first counter 82A exceeds the upper limit value for the first distance, it is determined that it was not possible to measure the first distance F1. In a case in which it was possible to measure the first distance F1, the process proceeds to step S33. On the other hand, in a case in which it was not possible to measure the first distance F1, the process proceeds to step S41, and it is determined that a reading target is a non-carrier sheet. In addition, the upper limit value is a value for stopping measuring of the first distance F1, and whether or not the first distance F1 is an appropriate value which matches a size of the carrier sheet CS is determined in the subsequent processing.

In step S33, whether or not the first distance F1 is in a regulated range is determined. Here, the regulated range is set to a range of a value in which the first distance F1 can be assumed as a distance from a tip end 59A of the carrier sheet CS to edges 59B of the first marks 53A and 54A. When the first distance F1 is in the regulated range, the process proceeds to step S34. On the other hand, when the first distance F1 is not in the regulated range, the process proceeds to step S41, and it is determined that a reading target is a non-carrier sheet.

In step S34, the second distance F2 from detecting of starting end of the first mark to detecting of a termination is measured by the first CS sensor. The first counter 82A measures the second distance F2 from the edge 59B on the downstream side of the marks 53A and 54A in the transport direction Y to the edge 59C on the upstream side in the transport direction Y, that is, a width of the mark 53A. Specifically, when the first CS sensor 46A is switched from the detecting state to the non-detecting state, a discrete value of the first counter 82A at the time is obtained as the second distance F2. In addition, in a case in which it is possible to measure the second distance F2, the first counter 82A is reset, after reading the second distance F2.

In step S35, whether or not it is possible to measure the second distance F2 is determined. The computer 60 determines that it was possible to measure the second distance F2 when the first CS sensor 46A is switched from the detecting state to the non-detecting state, before the discrete value of the first counter 82A exceeds the upper limit value. For this reason, in a case in which the first CS sensor 46A is not switched from the detecting state to the non-detecting state, even when the discrete value of the first counter 82A exceeds the upper limit value for the second distance, it is determined that it was not possible to measure the second distance F2. In a case in which it was possible to measure the second distance F2, the process proceeds to step S36, On the other hand, in a case in which it was not possible to measure the second distance F2, the process proceeds to step S41, and it is determined that a reading target is a non-carrier sheet. In addition, the upper limit value is a value for stopping measuring of the second distance.

In step S36, a third distance F3 from detecting a termination of the first mark to detecting a starting end of the second mark is measured by the first CS sensor. The first counter 82A measures the third distance F3 from the edge 59C on the upstream side of the marks 53A and 54A in the transport direction Y to the edge 59D on the downstream side of the subsequent marks 53B and 54B in the transport direction Y. Specifically, when the first CS sensor 46A is switched from the non-detecting state to the detecting state, a discrete value of the first counter 82A at the time is obtained as the third distance F3.

In step S37, whether or not it was possible to measure the third distance F3 is determined. The computer 60 determines that it was possible to measure the third distance F3 when the first CS sensor 46A is switched from the non-detecting state to the detecting state, before a discrete value of the first counter 82A exceeds an upper limit value for the third distance. For this reason, in a case in which the first CS sensor 46A is not switched from the non-detecting state to the detecting state, even when the discrete value of the first counter 82A exceeds the upper limit value for the third distance, it is determined that it was not possible to measure the third distance F3. In a case in which it was possible to measure the third distance F3, the process proceeds to step S38. On the other hand, in a case in which it was not possible to measure the third distance F3, the process proceeds to step S41, and it is determined that a reading target is a non-carrier sheet. In addition, the upper limit value is a value for stopping measuring of the third distance, and whether or not the third distance F3 is an appropriate value which matches a size of the carrier sheet CS is determined in the subsequent process.

In step S38, whether or not the third distance F3 is in a regulated range is determined. Here, the regulated range is set to a range of a value in which the third distance F3 can be assumed as a distance from the edge 59C on the upstream side of the first marks 53A and 54A to the edge 59D on the downstream side of the second marks 53B and 54B. When the third distance F3 is in the regulated range, the process proceeds to step S39. On the other hand, when third distance F3 is not in the regulated range, the process proceeds to step S41, and it is determined that a reading target is a non-carrier sheet.

In step S39, it is determined that a reading target is a carrier sheet.

In the subsequent step S40, a setting direction of a carrier sheet is determined based on a detection result of the second CS sensor. That is, when the second CS sensor 46B is in the mark non-detecting state of not detecting a mark, as illustrated in FIG. 11, in a section in which the first CS sensor 46A is detecting a mark, the computer 60 determines that the carrier sheet CS which is discriminated at the time based on a detection result of the first CS sensor 46A is in the forward direction. On the other hand, when the second CS sensor 46B is in the mark detecting state of detecting a mark, in a section in which the first CS sensor 46A which is illustrated in FIG. 12 is detecting a mark, the computer 60 determines that the carrier sheet CS which is discriminated at the time based on a detection result of the first CS sensor 46A is in the rearward direction. In addition, since a plurality (for example, two) of the number of marks are set to a detecting target of the first CS sensor 46A and the second CS sensor 46B, there is no concern that a punch hole which is perforated in a paper document is erroneously detected as a mark. In addition, since a distance related to a mark is measured, without counting the number of marks, there is no concern of an erroneous detection, even when there are a plurality of punch holes.

According to the above described first embodiment, it is possible to obtain the following effects.

(1) The CS sensor 46 (carrier sheet sensor) as an example of the sheet detecting unit is disposed at a position on the upstream side in the transport direction Y of a disposing position of the double feeding detecting sensor 47 as an example of the double feeding detecting unit. Accordingly, in a case in which image reading is performed by interposing a document D in a carrier sheet CS, it is possible to detect that a transport target is the carrier sheet CS, before the carrier sheet CS is erroneously detected as double feeding of a document, using the double feeding detecting sensor 47. For this reason, it is possible to avoid a situation in which an operation of reading a document D which is interposed in the carrier sheet CS is stopped due to such an erroneous detection of the double feeding detecting sensor 47.

(2) Since a double feeding detection using the double feeding detecting sensor 47 is invalidated when the CS sensor 46 detects the carrier sheet CS, it is possible to avoid a situation in which an operation of reading the document D which is interposed in the carrier sheet CS is stopped as a result in which the double feeding detecting sensor 47 erroneously detects the carrier sheet CS as double feeding of the document D. For example, it is not necessary for a user to make an effort to operate the double feeding detection invalidating switch 25 so as to invalidate a double feeding detection, before staring a reading operation, or to operate the input unit 101 so as to give an instruction of invalidating a double feeding detection to the reading driver 105 in the host device 100. In this manner, since there is no need of an operation of invalidating a double feeding detection manually, with which a user is charged, it is possible to reduce an operating labor of a user to that extent.

(3) The second CS sensor 46B as an example of the direction detecting unit which can detect a direction of a carrier sheet CS (whether forward direction or rearward direction), and a main control unit 70 as an example of the processing unit which switches image reading processing contents according to a detected direction (whether forward direction or rearward direction) are further provided. Accordingly, the image reading processing contents are switched according to a setting direction of the carrier sheet CS (whether forward direction or rearward direction). For this reason, it is possible to perform image reading processing of a document D with appropriate contents corresponding to the detected direction, with respect to an image obtained when the reading unit 40 reads the carrier sheet CS in which the document D is interposed. Accordingly, it is possible for a user to designate contents of processing which is to be performed by the image reading apparatus 11, by selecting a setting direction of the carrier sheet CS which is to be set in the image reading apparatus 11 from among the forward direction and the rearward direction.

(4) The main control unit 70 as an example of the processing unit determines whether to set a side at which a front face image and a rear face image of a document D are combined on the left side or the right side, according to a setting direction of the carrier sheet CS (whether forward direction or rearward direction). That is, the main control unit 70 switches a stitch direction which regulates whether to set a side at which the front face image and the rear face image of the document D (for example, folded document, or the like) which is interposed in the carrier sheet CS are combined on the left side or the right side, according to a setting direction of the carrier sheet CS (whether forward direction or rearward direction) which is detected by the second CS sensor 46B as an example of the direction detecting unit. Accordingly, it is possible for a user to obtain a combined image in which the front face image and the rear face image are combined at a side of an actual fold, even when the carrier sheet CS in which the document D is interposed is set to any direction of the forward direction and the rearward direction. For example, even when a user sets the carrier sheet CS to the forward direction or the rearward direction with an intention of selecting a task condition, it is possible to obtain an appropriate combined image in which the front face image and the rear face image are combined at the side of the actual fold.

(5) The image reading processing contents which the main control unit 70 as an example of the processing unit switches according to a direction of the carrier sheet CS (whether forward direction or rearward direction) includes all of reading conditions for reading an image of a document, image processing contents which are performed with respect to read data which is obtained by the reading unit 40, and storing conditions for storing read data after being subjected to image processing in a designated storage destination. Accordingly, the reading conditions for reading an image of a document, the image processing contents which are performed with respect to read data, and the storing conditions for storing read data after being subjected to image processing in a designated storage destination are switched according to the direction of the carrier sheet CS (whether forward direction or rearward direction). Accordingly, it is possible for a user to select the reading conditions, the image processing contents, and the storing conditions, by selecting a setting direction (whether forward direction or rearward direction) of the carrier sheet CS on the document support 13 of the image reading apparatus 11. For example, when reading an image of a specific document D in which it is necessary to read the document by interposing the document in the carrier sheet CS, it is possible to read the image of the document on a specific image reading condition which matches the specific document D, and moreover, it is possible to select a desired one from two, in the specific image reading processing contents, by selecting a setting direction of the carrier sheet CS from among the forward direction and the rearward direction.

(6) The marks 53 and 54 as examples of the portion to be detected, with which it is possible to detect a carrier sheet CS, are provided in the carrier sheet CS. The first CS sensor 46A as an example of the sheet detecting unit is provided at a position at which it is possible to detect the marks 53 and 54 in the process of transporting the carrier sheet CS using the transport unit. Accordingly, it is possible for the first CS sensor 46A to detect the marks 53 and 54 which are provided in the carrier sheet CS, in the process of transporting the carrier sheet CS, and it is possible to detect that a reading target is the carrier sheet CS, based on a detection result of the marks 53 and 54.

(7) The marks 55A and 55B as examples of the portion to be detected in which it is possible to detect whether a setting direction is the forward direction or the rearward direction are provided in the carrier sheet CS, and the second CS sensor 46B as an example of the direction detecting unit is provided at a position at which it is possible to detect the marks 55A and 55B of the carrier sheet CS. Accordingly, it is possible for the second CS sensor 46B to detect whether a setting direction of the carrier sheet CS is the forward direction or the rearward direction, depending on whether or not the marks 55A and 55B which are provided in the carrier sheet CS are detected. It is possible to combine the front face image SD1 and the rear face image SD2 of a document which is interposed in the carrier sheet CS at a side in an appropriate stitch direction, regardless of a setting direction of the carrier sheet CS (forward direction or rearward direction).

(8) Since the marks 53 and 54 are window portions which are formed of a transparent material, a lever (contact portion) of a contact-type sensor is barely caught by the marks 53 and 54, compared to a case of a hole. For example, since it is not necessary for the first CS sensor 46A to be offset with respect to a document presence detecting sensor 48 in the width direction X which intersects the transport direction Y, a degree of freedom when disposing the first CS sensor 46A increases, and it is possible to contribute to compactification of the image reading apparatus 11, for example.

In addition, the above described embodiment also can be changed to the following forms.

Figure 16:
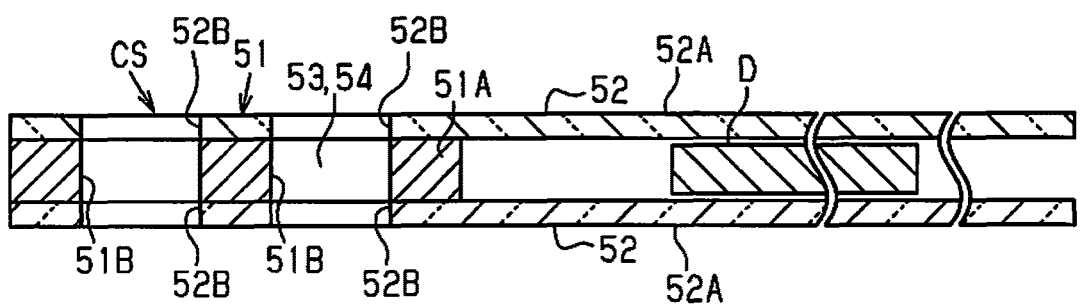
FIG. 16 is a side sectional view which is schematically illustrated, partially ruptured, and which illustrates a carrier sheet in which a document is interposed.

As illustrated in FIG. 15, the marks 53 and 54 as examples of the portion to be detected may be switched to a transparent portion, and may be set to a through hole as an example of a hole. The mark 53 includes marks 56A and 56B which are formed of through holes in the area A1. In addition, the mark 54 includes marks 57A and 57B which are formed of through holes in the area A1, and marks 58A and 58B which are formed of through holes in the area A2. As illustrated in FIG. 16, the marks 53 and 54 which are formed of through holes are formed, when the through hole 51B which is formed in the bonding material 51A, and the through hole 52B which is formed in the transparent sheet 52A communicate. In a case in which such marks 53 and 54 are through holes, there is a concern that a lever of a contact-type sensor such as the document sensor 45 and the document presence detecting sensor 48 may be caught by the marks 53 and 54 which are formed of through holes, in the process of transporting the carrier sheet CS. However, in the image reading apparatus 11 according to the embodiment, each of the CS sensors 46A and 46B is disposed at positions which is offset in the width direction X intersecting the transport direction Y with respect to the document presence detecting sensor 48. Since each of the CS sensors 46A and 46B which can detect a mark formed of a hole in this manner is located at a position which is offset in the width direction X with respect to the lever-type document presence detecting sensor 48, the lever of the document presence detecting sensor 48 is not located on the transport path of the marks 53 and 54. Accordingly, the lever of the document presence detecting sensor 48 is not caught by the holes of the marks 53 and 54.

Figure 17:
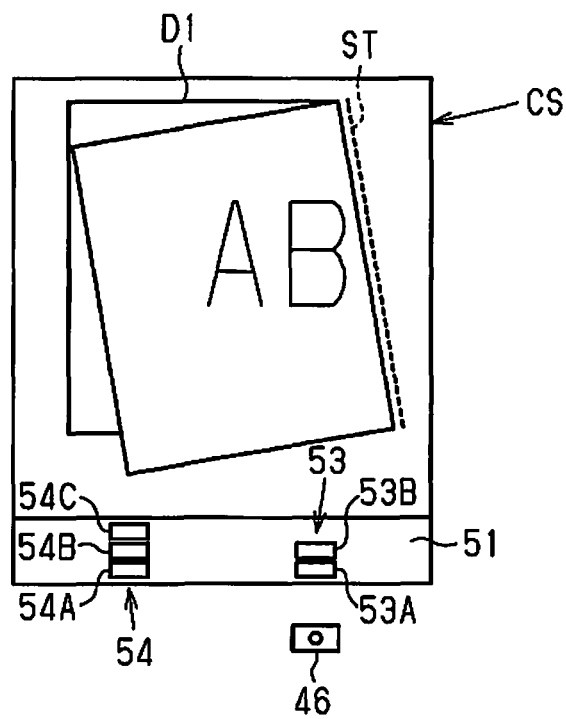
FIG. 17 is a schematic plan view which illustrates a carrier sheet in a modification example.
Figure 18:
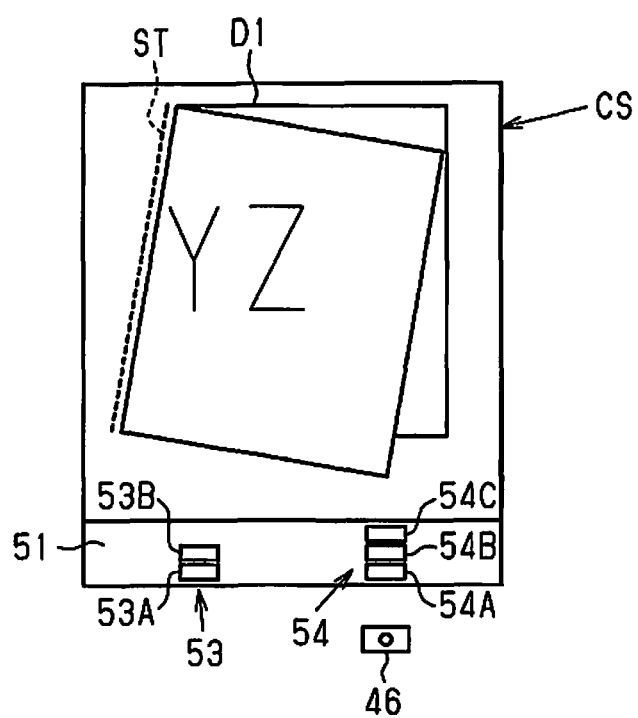
FIG. 18 is a schematic plan view which illustrates a carrier sheet in the same modification example.

As illustrated in FIGS. 17 and 18, the mark for detecting a setting direction of the carrier sheet CS, and the second CS sensor 46B which can detect the mark may be omitted. In addition, as illustrated in FIGS. 17 and 18, the number of marks which configures the marks 53 and 54 may be two marks 53A and 53B which configure the mark 53, and three marks 54A, 54B, and 54C which configure the mark 54. In this manner, when configuring the marks 53 and 54 using a plurality of marks, it is possible to avoid a situation in which a punch hole of a paper document is erroneously detected as the marks 53 and 54.

The number of marks which configures the marks 53 and 54 may be one, though there is a slight increases in frequency of erroneous detecting as a punch hole.

The image reading processing contents which are switched according to a direction of the carrier sheet CS (whether forward direction or rearward direction) using the main control unit 70 as an example of the processing unit may include at least one of the reading condition of reading an image of a document, the image processing contents which are performed with respect to read data obtained by the reading unit 40, and the storing condition for storing read data after being subjected to image processing in a designated storage destination.

It is not necessary for the task condition to include all of a reading resolution, a reading color, a stitch direction of a folded document, and a storage destination and a storage format of read data, and at least one of these may be included. For example, the task condition may have a configuration of including only reading conditions (reading resolution, reading color, or the like), or a configuration of including only storing conditions (data format, address of storage destination).

The image reading apparatus may be a flat-bed type, without being limited to the sheet feeding type. In a case of the flatbed-type image reading apparatus, a carriage which can move along the sub-scanning direction (X direction) is provided in a main body, the carriage moves using a motor for scanning as a power source, and an image of a document which is set on a glass plate of a document stand is read by a light source and a reading unit which are provided in the carriage. Also in such a flatbed-type image reading apparatus, an automatic document feeder (automatic sheet feeder) which automatically feeds a document may be provided.

The entire disclosure of Japanese Patent Application No.: 2015-211721, filed Oct. 28, 2015 is expressly incorporated by reference herein.

What is claimed is:
1. An image reading apparatus which reads an image of a document, the apparatus comprising:
    a plurality of pairs of rollers which transports a document;
    an image sensor which reads a document;
    a double feeding detector which detects double feeding of
        a document;

a first sheet detector which detects a carrier sheet which is transported in a state of interposing a document between two transparent sheet portions; and a lever-type document presence detector that detects a document and is arranged on a downstream side of the double feeding detector and the first sheet detector in a transport direction of a document, the first sheet detector being provided at a position on an upstream side of the double feeding detector in the transport direction.

2. The image reading apparatus according to claim 1, wherein, when the first sheet detector detects the carrier sheet, detection of the double feeding detector is invalidated.

3. The image reading apparatus according to claim 2, wherein a portion to be detected, with which the carrier sheet is detected, is provided in the carrier sheet, and wherein the first sheet detector is provided at a position at which the portion to be detected is detected in a process of transporting the carrier sheet by using the rollers.

4. The image reading apparatus according to claim 3, wherein the portion to be detected is a hole, and wherein the first sheet detector is disposed at a position offset in a width direction which intersects the transport direction with respect to the document presence detector.

5. The image reading apparatus according to claim 1, further comprising:

a second sheet detector which detects whether a direction of the carrier sheet is a forward direction or a rearward direction; and a processor which switches image reading processing contents according to a direction which is detected by the second sheet detector.

6. The image reading apparatus according to claim 5, wherein the processor switches a side at which a front face image and a rear face image of a document are combined, according to a direction in which the carrier sheet is detected.

7. The image reading apparatus according to claim 6, wherein a portion to be detected, with which the carrier sheet is detected, is provided in the carrier sheet, and wherein the first sheet detector and the second sheet detector are provided at positions at which the portion to be detected is detected in a process of transporting the carrier sheet using the rollers.

8. The image reading apparatus according to claim 7, wherein the portion to be detected, with which the second sheet detector detects whether or not a direction of the carrier sheet is the forward direction or in the rearward direction, is provided in the carrier sheet, and wherein the second sheet detector is provided at a position at which the portion to be detected is detected in a process of transporting the carrier sheet using the rollers.

9. The image reading apparatus according to claim 8, wherein the portion to be detected is a hole, and wherein the first sheet detector and the second sheet detector are disposed at positions offset in the width direction which intersects the transport direction with respect to the document presence detector.

10. The image reading apparatus according to claim 1, further comprising a processor which includes at least one of a reading condition of reading an image of a document, image processing contents which are provided in read data obtained by the image sensor, and a storing condition of storing read data after being subjected to image processing in a designated storage destination, in image reading processing contents which are switched according to a direction in which the carrier sheet is detected.

11. The image reading apparatus according to claim 10, wherein a portion to be detected, with which the carrier sheet is detected, is provided in the carrier sheet, and the portion to be detected is a window portion which is formed of a transparent material.

12. The image reading apparatus according to claim 1, further comprising a second sheet detector which detects whether a direction of the carrier sheet is a forward direction or a rearward direction, wherein the first sheet detector and the second sheet detector are provided at positions at which the first sheet detector and the second sheet detector detect the portion to be detected in a process of transporting the carrier sheet using the rollers.

13. An image reading method comprising:

transporting a carrier sheet in which a portion to be detected is provided in a bonding portion which forms a sheet portion for interposing a document by bonding two transparent sheets at a part of a peripheral edge portion, in a state of interposing a document in the sheet portion;

detecting in which the portion to be detected is detected in the middle of transporting the carrier sheet by a first sheet detector;

detecting double feeding of a document by a double feeding detector;

reading in which a front face image and a rear face image are obtained, by reading a front face and a rear face of a document which is interposed between the sheet portion, in the middle of transporting the carrier sheet;

detecting a document by a lever-type document presence detector that is arranged on a downstream side of the first sheet detector and the double feeding detector in a transport direction of a document;

specifying a combining direction in which a side at which the front face image and the rear face image are combined, based on a detection result which is obtained by detecting the portion to be detected; and image processing in which the front face image and the rear face image are combined at the specified side, and a combined image is generated.

* * * * *